(12) United States Patent
Borshchova et al.

(10) Patent No.: US 12,014,643 B2
(45) Date of Patent: *Jun. 18, 2024

(54) METHOD AND SYSTEM FOR COMMUNICATING UNICAST/MULTICAST MESSAGES USING AUTOMATIC DEPENDENT SURVEILLANCE-BROADCAST (ADS-B) PROTOCOL

(71) Applicant: SEAMATICA AEROSPACE LTD., St. John's (CA)

(72) Inventors: Iryna Borshchova, Ottawa (CA); Siu O'Young, St. John's (CA)

(73) Assignee: SEAMATICA AEROSPACE LTD., St. Johns (CA)

( * ) Notice: Subject to any disclaimer, the term of this patent is extended or adjusted under 35 U.S.C. 154(b) by 343 days.

This patent is subject to a terminal disclaimer.

(21) Appl. No.: 17/228,578

(22) Filed: Apr. 12, 2021

(65) Prior Publication Data

US 2021/0233417 A1    Jul. 29, 2021

Related U.S. Application Data

(63) Continuation-in-part of application No. 16/396,956, filed on Apr. 29, 2019, now Pat. No. 10,977,954.

(60) Provisional application No. 62/663,512, filed on Apr. 27, 2018.

(51) Int. Cl.
*H04L 12/28* (2006.01)
*G08G 5/00* (2006.01)
*H04L 9/08* (2006.01)
*H04L 9/30* (2006.01)
*H04L 69/324* (2022.01)
*G08G 5/04* (2006.01)

(52) U.S. Cl.
CPC ......... *G08G 5/0095* (2013.01); *G08G 5/0013* (2013.01); *G08G 5/0082* (2013.01); *H04L 9/0825* (2013.01); *H04L 9/30* (2013.01); *H04L 69/324* (2013.01); *G08G 5/0056* (2013.01); *G08G 5/0069* (2013.01); *G08G 5/04* (2013.01); *H04L 2209/84* (2013.01)

(58) Field of Classification Search
None
See application file for complete search history.

(56) References Cited

U.S. PATENT DOCUMENTS

| 4,782,450 A | 11/1988 | Flax |
| 5,196,856 A | 3/1993 | Litchford |

(Continued)

OTHER PUBLICATIONS

Laboda, Amy, "Unencrypted ADS-B Out Confounds Aircraft Blocking", AINonline, NBAA Convention News, www.ainonline.com/aviation-news/business-aviation/2015-11-14/unencrypted-ads-b-out-confounds-aircraft-blocking-0, Nov. 14, 2015.

(Continued)

*Primary Examiner* — Clemence S Han
(74) *Attorney, Agent, or Firm* — IP-MEX INC.; Victoria Donnelly

(57) ABSTRACT

Methods are described for generating encrypted messages and unicast/multicast transmitting the encrypted messages to one or more aircraft using Automatic Dependent Surveillance-Broadcast (ADS-B) transmission. Corresponding system for communicating messages to an aircraft using ADS-B link is also provided.

32 Claims, 16 Drawing Sheets

(56) References Cited

U.S. PATENT DOCUMENTS

| | | | | |
|---|---|---|---|---|
| 5,689,273 | A | * | 11/1997 | Bailey .................. G01S 1/16 340/979 |
| 6,748,325 | B1 | * | 6/2004 | Fujisaki ............... G08G 5/0086 701/301 |
| 9,274,521 | B1 | | 3/2016 | Stefani et al. |
| 9,405,005 | B1 | | 8/2016 | Arteaga |
| 10,663,597 | B1 | * | 5/2020 | Dormiani ............ G08G 5/0078 |
| 10,977,954 | B2 | * | 4/2021 | Borshchova ......... G08G 5/0082 |
| 2005/0156777 | A1 | * | 7/2005 | King .................... G08G 5/0021 342/29 |
| 2008/0266166 | A1 | * | 10/2008 | Schuchman ......... G08G 5/0082 342/37 |
| 2009/0085792 | A1 | * | 4/2009 | Ino ....................... G01S 13/782 342/37 |
| 2010/0295719 | A1 | * | 11/2010 | Habib ................... G01S 13/91 342/36 |
| 2012/0041620 | A1 | * | 2/2012 | Stayton ............... G08G 5/0008 701/3 |
| 2012/0262339 | A1 | * | 10/2012 | Garcia .................. G01S 5/10 342/387 |
| 2015/0331099 | A1 | * | 11/2015 | Wu ....................... G01S 13/876 342/32 |
| 2017/0106997 | A1 | * | 4/2017 | Bekanich .............. G08B 25/10 |
| 2018/0027382 | A1 | * | 1/2018 | Taboso ................. G08G 5/0052 370/312 |
| 2019/0019420 | A1 | * | 1/2019 | X .......................... G08G 5/0069 |
| 2019/0383936 | A1 | * | 12/2019 | Bartone ................ G01S 13/878 |

OTHER PUBLICATIONS

TCC, "The Security of ADS-B Transmissions", www.tccsecure.com/NewsResources/CipherONEBlog/Tabld/1222/ArtMID/1578/ArticleID/2062/The-Security-of-ADS-B-Transmissions.aspx, Jan. 16, 2017.

TCC, "The Security of ADS-B Transmissions—Part 2", www.tccsecure.com/NewsResources/CipherONEBlog/Tabld/1222/ArtMID/1578/ArticleID/2063/The-Security-of-ADS-B-Transmissions-Part-2.aspx, Feb. 6, 2017.

Collins, Mike, "ADS-B: Incognito, AOPA Pushing for ADS-B Privacy Improvements", www.aopa.org/news-and-media/all-news/2019/february/pilot/ads-b-incognito, Feb. 1, 2019.

Croft, John, Industry Considers ADS-B Encryption to Bolster Privacy, AviationDaily, aviationweek.com/awincommercial/industry-considers-ads-b-encryption-bolster-privacy, Nov. 6, 2015.

Finke, Cindy, et al., "ADS-B encryption: confidentiality in the friendly skies", ACM Digital Library, CSIIRW '12, Oct. 30-Nov. 2, Oak Ridge, Tennessee, USA, ACM 978-1-4503-1687-3, 2012.

"How can ADS-B be secure when it is based on self-reporting?", aviation.stackexchange.com/questions/13459/how-can-ads-b-be-secure-when-it-is-based on-self-reporting, Mar. 2015.

Strohmeier, Martin, et al., "Security of ADS-B: State of the Art and Beyond", arXiv:1307.3664v1 [cs.CR] Jul. 13, 2013.

Strohmeier, Martin, et al., "On the Security of the Automatic Dependent Surveillance-Broadcast Protocol", arXiv:1307.3664v2 [cs.CR] Apr. 15, 2014.

Seo, Dong-Woo et al., "System integration of GPSR and ADS-B for aeronautical ad hoc networks", Conference Paper, Pohang University of Science and Technology, 978-1-4244-2677-5/08, IEEE, Dec. 2008.

IEEE Computer Society, IEEE Standard for Information technology—Telecommunications and information exchange between systems Local and metropolitan area networks—Specific, IEEE Std 802.11TM-2012 requirements, "Part 11: Wireless LAN Medium Access Control (MAC) and Physical Layer (PHY) Specifications", Mar. 29, 2012.

Pawlitzki, Alexander, "ADS-B Integrated Services, Enabling common airspace sharing by global E-identification and geo-fencing for open and specific UAS categories", White Paper, ADSBFS-IN-TASD-0046, ThalesAlenia Space, Jan. 29, 2018.

Ramsey, Christian, "Inert and Alert: Intelligent ADS-B for UAS NAS Integration" Concept of Operations, uAvionix.

Hobbs, Alan, et al., "Human Factors Guidelines for Remotely Piloted Aircraft System Remote Pilot Stations", TN-34128, National Aeronautics and Space Administration, Jul. 2016.

Harkins, Dan, et al., "The IEEE 802.11s Mesh Networking Amendment", Mar. 14, 2011—IEEE plenary meeting, Singapore, IEEE doc. 11-11-0380-00.

Universal Mobile Telecommunications System (UMTS); Spreading and modulation (FDD) (3GPP TS 25.213 version 12.0.0 Release 12), Technical Specification, ETSI TS 125 213 V12.0.0 (Sep. 2014).

11C.7.5 Frame addressing and forwarding in an MBSS, IEEE P802.11s/D4.0, Dec. 2009 (page excerpt).

De Barros Barreto, Alexandre, et al., Project "ADS-B Security", www.researchgate.net/project/ADS-B Security.

Gauthier, Ryan, et al., "Addressing Operator Privacy in Automatic Dependent Surveillance—Broadcast (ADS-B)" Hawaii International Conference on System Sciences, Jan. 2018—www.researchgate.net/publication/323379595_Addressing_Operator_Privacy_in_Automatic_Dependent_Surveillance_-_Broadcast_ADS-B.

* cited by examiner

*FIG. 7A (prior art)*

METHOD AND SYSTEM FOR COMMUNICATING UNICAST/MULTICAST MESSAGES USING AUTOMATIC DEPENDENT SURVEILLANCE-BROADCAST (ADS-B) PROTOCOL

CROSS REFERENCE TO RELATED APPLICATIONS

The present application is a Continuation-in-Part of U.S. application Ser. No. 16/396,956 filed Apr. 29, 2019 and issued as a U.S. Pat. No. 10,977,954 on Apr. 13, 2021, which in turn claims the benefit of the U.S. provisional patent application Ser. No. 62/663,512 filed on Apr. 27, 2018; the entire contents of the above note US patent and patent applications are incorporated herein by reference.

FIELD OF THE INVENTION

The present application relates to communicating unicast/multicast messages using an Automatic Dependent Surveillance-Broadcast (ADS-B) protocol, in particular for application to the art of enabling a safeguard communication in the aeronautics industry, and, in particular, to a method and system for communicating flight control commands to an aircraft, for example to unmanned aircraft (UA) and Ground Stations (GS).

BACKGROUND OF THE INVENTION

Currently, the UAs are operated according to FIG. 1. The UA 100 is controlled by an on-board autopilot 104 which receives the flight control commands from a ground radio 108 through a bidirectional radio link 112. The Ground Control Station 102 comprises a processing computer PC 106 for processing the data obtained from the ground radio 108, and to generate flight control commands. The flight control commands generated by the processing computer 106 are provided to the radio 108 via communication link 110. The flight control commands received by the radio 108 are transmitted via radio frequency telemetry link 112 to the UA 100, to be referred to as radio link for simplicity. This radio link is short range which does not allow to control the UA from remote locations, when, for example, a third party needs to communicate to the UA. Another drawback is the risk of a "fly-away" UA. When a radio control link loss occurs, an autonomous UA can fly on its own, posing dangers to the general public on the ground, as well as to other aircraft (manned and unmanned) in its vicinity and over great distances. In the case when the control link is lost, the Pilot-In-Command (PIC) should still be able to mitigate the risks of collision: certain collision avoidance maneuvers must be communicated to the UA and then further executed by the onboard autopilot.

One prior art solution is shown in FIG. 2, where a secondary radio link 114 is integrated in the system to connect the UA 100 to the Ground Control Station 102. The secondary radio link 114 is a redundant link which is used in the case when a primary radio link 112 is lost. Two solutions are viable: to establish the secondary radio link 114 on the same frequency as the primary radio link 112, which provides the redundancy of the hardware; or use a secondary radio link 114 of a lower frequency, which could decrease the performance of the primary link 112. Also, considering the lack of the space on board of a small UA, two radio frequency (RF) links positioned close to each other could create interference. Another disadvantage of such approach is that the secondary radio link 114 may be lost by being blocked by tall objects in the operation area of the UA. Another potential disadvantage is that the same operational conditions which lead to the loss of connectivity of the primary radio link 112 may also cause a failure in connectivity for the secondary radio link 114.

The loss of radio link needs to be addressed as a link-loss procedure or emergency situation. It is important that an aircraft always operates in a predictable manner. Moreover, it is important to know a position of the aircraft at the time of link-loss, and execute an emergency maneuver which does not pose any danger to humans, private property, other aircraft, etc. It is also important that the third party can send any commands to the UA from remote locations where primary radio link is not within the communication range. Link loss in current description is only one example of an emergency situation, and the principles of the inventions can be applied in other situations.

Currently available are established aeronautical technologies: Automatic Dependent Surveillance-Broadcast (ADS-B) transmission protocol and Universal Access Transceivers (UAT) radio hardware. ADS-B is used by aircraft and certain equipped ground stations to share flight information, and UAT is a multi-purpose aeronautical data link intended to support ADS-B and other flight and traffic information services.

The ADS-B is a surveillance technology in which an aircraft determines its position via satellite navigation and periodically broadcasts the position of the aircraft, enabling the position to be tracked. The information can be received by Air Traffic Control Ground Stations as a replacement for secondary radar as no interrogation signal is needed from the ground. It can also be received by other aircraft to provide situational awareness and allow self-separation. ADS-B is "automatic" in that it requires no pilot or external input. It is "dependent" in that it depends on data from the navigation system of the aircraft.

ADS-B has two different services, "ADS-B Out" and "ADS-B In", and enhances safety by making an aircraft visible, in real-time, to Air Traffic Control (ATC) and to other appropriately equipped ADS-B aircraft with position and velocity data transmitted periodically. ADS-B data may be recorded and downloaded for post-flight analysis. ADS-B also provides data infrastructure for inexpensive flight tracking, planning, and dispatch.

"ADS-B Out" periodically broadcasts information about each aircraft, such as identification, current position, altitude, and velocity, through an onboard transmitter. ADS-B Out provides air traffic controllers with real-time position information that is, in most cases, more accurate than the information available with current radar-based systems. With more accurate information, ATC can position an aircraft with improved precision and timing.

"ADS-B In" is the reception by aircraft of Flight Information Services-Broadcast (FIS-B) and Traffic Information Service-Broadcast (TIS-B) data and other ADS-B data such as direct communication from nearby aircraft. Ground station broadcast data is typically only made available in the presence of an ADS-B Out broadcasting aircraft, limiting the usefulness of purely ADS-B In devices.

The ADS-B technology relies on two avionics components, high-integrity GPS navigation source and a datalink (ADS-B unit). There are several types of certified ADS-B data links, but the most common ones operate at 1090 MHz, or at 978 MHz (UAT).

However, neither the existing radio link technology nor ADS-B technology could address a problem of more reliable communication with an aircraft, in particular in emergency situations, while remaining compliant with existing aviation standards and avoiding the need of replacing existing hardware equipment at both ground stations and aircraft.

Therefore, there is a need in the industry for developing an improved system and method for sending control commands to an aircraft from several locations, including remote locations of third-parties, to mitigate a risk in emergency situations such that collision with manned aircraft, fly-away, radio link loss etc. while addressing air privacy concerns.

SUMMARY OF THE INVENTION

It is an objective of the present invention to provide an improved method and system for communicating flight control commands to/from unmanned aircraft or aerial vehicles (UAVs), thus improving aircraft safety.

According to one aspect of the invention, there is provided a method for unicast or multicast transmission via an Automatic Dependent Surveillance-Broadcast (ADS-B) transmission protocol, the method comprising: encrypting a message, to be carried on a ADS-B Universal Access Transceiver (UAT) frame for transmission from a first entity to a second entity, with a unique set of keys associated with the first entity and the second entity to generate an encrypted message, generating a header indicating an ADS-B frame type, generating an identifier for uniquely identifying the second entity, the identifier being known to the first and second entities, and forming an ADS-B UAT frame comprising a header portion, and a payload portion comprising a subheader, comprising: inserting the header into the header portion, and inserting the encrypted message and the identifier into the payload portion, thereby making the ADS-B UAT frame compatible with a standard ADS-B UAT frame, and transmitting the ADS-B UAT frame to the second entity, thereby converting the ADS-Broadcast transmission protocol into a unicast or multicast transmission.

The step of the inserting the encrypted message and the identifier comprises carrying the encrypted message and the identifier on undefined messages of the ADS-B UAT frame. The step of the inserting the encrypted message and the identifier comprises carrying the encrypted message and the identifier on reserved fields of the ADS-B UAT frame. The step of the inserting the encrypted message and the identifier comprises carrying the encrypted message and the identifier on reserved messages of the ADS-B UAT frame.

The step of the generating the identifier comprises using one of: a destination address, an International Civil Aviation Organization (ICAO) number, and generating a "code number" for one of: unicast transmission, and multicast transmission.

The step of the generating the message comprises selecting the first entity and the second entity at least as one of the following: the first entity is a ground station, and the second entity is one of an aircraft and a group of aircraft, the first entity is the aircraft, and the second entity is the ground station, the first entity is the aircraft, and the second entity is one of another aircraft and a group of other aircraft, the first entity is the another aircraft, and the second entity is one of the aircraft and the group of aircraft, the first entity is the ground station, and the second entity is another ground station.

The method described above further comprises: modifying the identifier before a flight or takeoff, thereby creating a modified identifier, and uploading the modified identifier to the second entity and the first entity.

The step of the generating the identifier further comprises storing the identifier in a database in a memory device, further comprises storing the database in at one of: the first entity, the second entity, a third party server in communication with at least one of the first entity and second entity, and another server hosted at the first entity, yet another server hosted at the second entity.

The step of the forming further comprises limiting the frame size not to exceed a length of a standard ADS-B UAT frame as specified in standard specifications.

The step of the limiting comprises at least one of the following: adjusting a size of the unique set of keys for encryption, using another encryption technique, encrypting only part of the message, compressing the message, inserting an index of the message in the payload, instead of inserting the entire message.

According to yet another aspect of the present invention, there is provided a system for unicast or multicast transmission via an Automatic Dependent Surveillance-Broadcast (ADS-B) transmission protocol, the system comprising: a processor, and a memory device having computer readable instructions stored thereon for execution by the processor, causing the processor to:

generate a message to be carried on a ADS-B Universal Access Transceiver (UAT) frame for transmission from a first entity to a second entity, encrypt the message with a unique set of keys associated with the first entity and the second entity to generate an encrypted message, generate a header indicating an ADS-B frame type, generate an identifier for uniquely identifying the second entity, the identifier being known to the first and second entities, and form an ADS-B UAT frame comprising a header portion, and a payload portion comprising a sub-header, comprising: insert the header into the header portion, and insert the encrypted message and the identifier into the payload portion, thereby making the ADS-B UAT frame compatible with a standard ADS-B UAT frame, and transmit the ADS-B UAT frame to the second entity, thereby converting the ADS-Broadcast transmission protocol into a unicast or multicast transmission.

The computer readable instructions cause to insert the encrypted message and the identifier further cause the processor to carry the encrypted message and the identifier on undefined messages of the ADS-B UAT frame, and wherein the undefined messages of the ADS-B UAT frame have a payload type code between 30 and 31.

The computer readable instructions cause to insert the encrypted message and the identifier further cause the processor to carry the encrypted message and the identifier on reserved fields of the ADS-B UAT frame, wherein the reserved fields of the ADS-B UAT frame have a payload type code between 7 and 10.

The computer readable instructions cause to insert the encrypted message and the identifier further comprise the processor to carry the encrypted message and the identifier on reserved messages of the ADS-B UAT frame, wherein the reserved messages of the ADS-B UAT frame have a payload type code between 11 and 29. The system described above further comprises: the identifier is inserted into the subheader, and insert the identifier into the encrypted message.

In the system described above, the identifier is at least one of: the identifier is generated at the first entity, the identifier is generated at the second entity, and the identifier is retrieved from a third party, in communication with the first and second entity. The frame size is limited not to exceed a length of a standard ADS-B UAT frame of 34 bytes as specified in standard specifications. The unique set of keys is encrypted with a private key of the first entity and a public key of the second entity. In the system described above, the message is one of the following: a command and control message, an emergency command, an information message, a message selected from a menu of predetermined messages.

According to yet another aspect of the present invention, there is provided a frame formatter for a ADS-B UAT frame for one of a unicast and multicast transmission from a first entity to a second entity, the ADS-B frame carrying an encrypted message encrypted with a unique set of keys associated with the first entity and the second entity, the frame formatter comprising: a processor, and a memory device having computer readable instructions stored thereon for execution by the processor, causing the processor to: form an ADS-B UAT frame comprising a header portion, and a payload portion comprising a sub-header, comprising: inserting a header indicating an ADS-B frame type into the header portion, and inserting the encrypted message and an identifier into the payload portion, the identifier uniquely identifying the second entity, the identifier being known to the first and second entities, thereby making the ADS-B UAT frame compatible with a standard ADS-B UAT frame, and converting the ADS-Broadcast transmission protocol into a unicast or multicast transmission.

Thus, an improved method and system for communicating commands and control messages from/to an aircraft have been provided.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which:

FIG. 7A, illustrates a table showing the frame format, different fields and different message types of and ADS-B UAT frame;

DESCRIPTION OF EMBODIMENTS OF THE INVENTION

Figure 3:
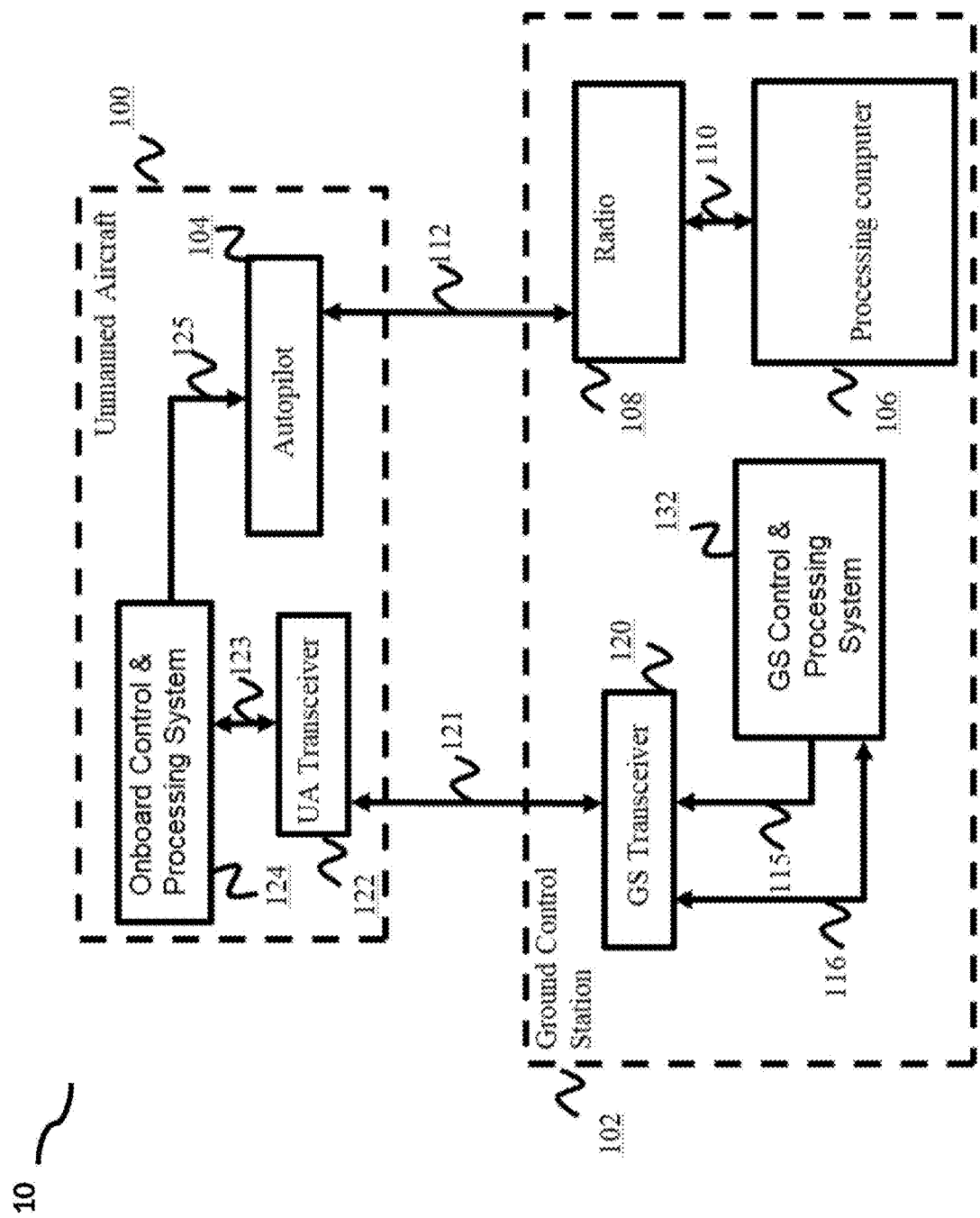
FIG. 3 illustrates a communication system for communicating with an aircraft according to an embodiment of the invention.

FIG. 3 illustrates a communication system 10 for communicating command and control messages to/from an aircraft, according to the embodiment of the invention. In this application, the aircraft is an unmanned aircraft (UA) 100, or a manned aircraft. By way of example, an unmanned aircraft (UA) 100 will be described in the following embodiments, which is controlled by an autopilot 104. In the present application, the unmanned aircraft 100 is any aircraft operated by an autopilot, which in turn is controlled from a ground station remotely by the Pilot-in-Command or PIC.

The communication system 10 comprises a Ground Control Station 102, which is in communication with the UA 100. The Ground Control Station comprises the radio link 112 and a ground station (GS) transceiver 120, controlled by a Ground Station Control and Processing System 132A detailed description of the GS Control and processing System 132 will be provided later in the description of FIG. 6.

Figure 1:
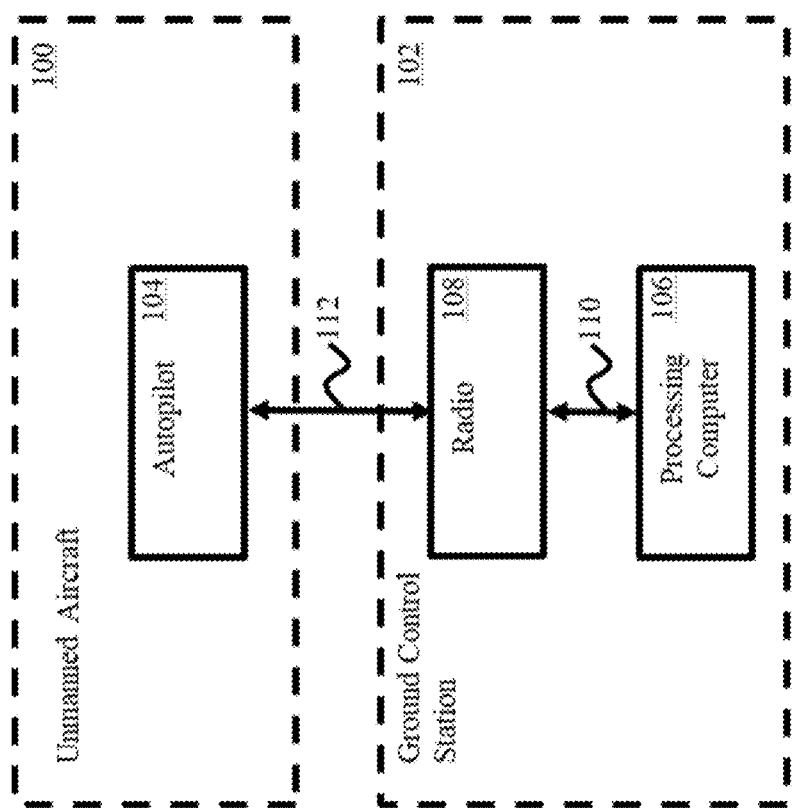
FIG. 1 illustrates a prior art communication system for communicating with an aircraft.
Figure 2:
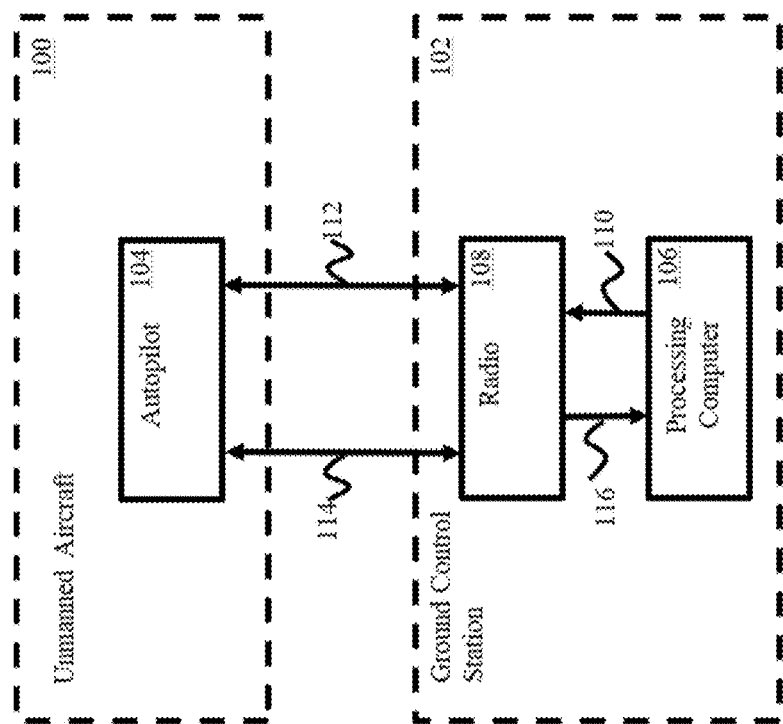
FIG. 2 illustrates another prior art communication system for communicating with an aircraft.
Figure 4:
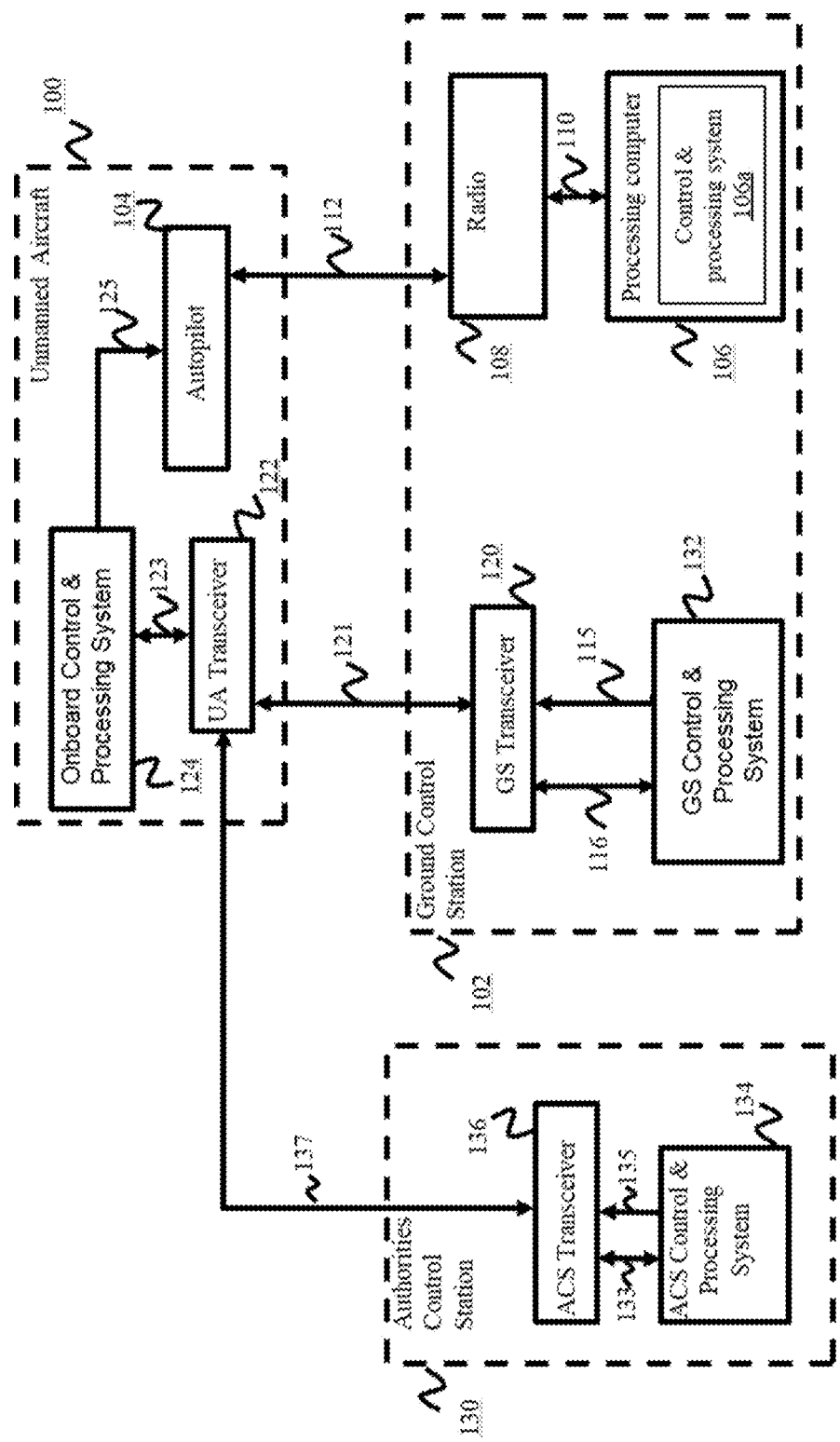
FIG. 4 illustrates a communication system for communicating with an aircraft according to another embodiment of the invention.

A person of ordinary skill in the art would recognize that in this embodiment, the control and processing system 132 can be implemented as a stand-alone system without the need to modify the software running on the existing processing computer 106 of the Ground Control Station 102 of FIGS. 1 and 2. In a further embodiment, processing computer 106 can comprise a memory device storing additional software for performing functions of the control and processing system 106a as shown in FIG. 4.

The unmanned aircraft 100 comprises the autopilot 104 and an UA transceiver 122, both controlled by an Onboard control and processing system 124 at the UA 100 as shown in FIG. 3. The Onboard control and processing system 124 is provided for control of emergency situation and for communicating with the ground station control and processing system 132 or other entities according to the principles of the invention. Conveniently, the ground transceiver 120 and the UA transceiver 122 may be Universal Access Transceivers (UAT) for example.

The embodiment of the present invention incorporates the Automatic Dependent Surveillance-Broadcast (ADS-B) transmission protocol to provide an additional ADS-B compliant communication link 121 between the GS transceiver 120 and the UA transceiver 122, thereby providing an additional communication channel between the Ground Control Station 102 and the UA 100. The present invention transforms ADS-B that was designed for broadcasting flight data into a point-to-point or point-to-multipoint communication system for any type of message and in particular for aircraft command and control messages. A method and system are thus provided to achieve this unicast or multicast communication via ADS-B protocol, while remaining compatible with industry standardized UAT transceiver hardware. This is achieved by encrypting part of the ADS-B message and transmitting it from Ground station 102 to the UA 100, or vice versa and by providing corresponding control and processing systems at both ground station 102 and UA 100 while keeping unchanged the frame structure of the ADS-B UAT frame. Multicast, in the current applications, means communicating the same encrypted message to a selected number of entities which share same encryption keys.

The ADS-B communication link 121 is in addition to the primary radio link 112 between the radio 108 and the UA 100. The ADS-B communication link 121 is used to transmit command and control messages from/to the ground transceiver 120 to/from the UA transceiver 122.

Since the ADS-B transmission protocol uses a low frequency and high-power communication link, it is more reliable compared to a traditional RF telemetry link 112. The ADS-B protocol technology uses GPS to determine the position of the aircraft 100.

When the radio link 112 is lost, there is no communication between the radio 108 of Ground Control Station 102 and the autopilot 104 of the aircraft 100. However, the ADS-B communication link 121 between the ground transceiver 120 and the UA transceiver 122 at the aircraft 100 is still present.

An action of the PIC invokes sending an encoded command and control message 115 from the GS control & processing system 132 to the GS transceiver 120. Upon receiving the encoded command and control message 115 formatted according to the principles of the invention, the ground transceiver 120 sends the message thus formatted to the UA transceiver 122 via ADS-B link 121 that only a specific UA 100 can decrypt.

In one embodiment of the present invention, the PIC selects a command and control message, out of a plurality of messages. Once the command and control message is selected, the command is encoded and formatted according to the principles of the invention before being provided to the GS transceiver 120 for transmission to the UA 100. This operation will be further described below.

Once the encoded command and control message 115 is transmitted by the GS transceiver 120 as the transmitted encoded command and control message over the ADS-B communication link 121, it is received by the UA transceiver 122 at the aircraft 100 and provided, via communication link 123, to the onboard control & processing system 124. The contents of the encoded command and control message 115 transmitted over the ADS-B communication link 121 are processed by the onboard control & processing system 124. After receiving and decoding the encoded command and control message 115 to retrieve the command and control message, the UA transceiver 122 will send an "acknowledgement" message to the Ground Station 102, followed by a control action to the autopilot 104 to execute a required emergency maneuver.

In an embodiment of the present invention, the onboard control & processing system 124 decodes the transmitted encoded command and control message sent over the ADS-B communication link 121 with a pair of unique encoding or encryption/decryption keys. The acknowledge message is then sent to the ground station, and the emergency flight command 125 is provided to the autopilot 104 to execute the required emergency maneuver.

FIG. 4 illustrates yet another embodiment of the present invention including an Authority Control Station control and processing system 134 for handling operation when an emergency situation arises. In FIG. 4, similar elements have been designated with the same reference numerals as shown in FIG. 3, with an additional authorities control station 130.

The PIC action is shown in FIG. 4 relying on the link 116 between the GS control & processing system 132 and the GS transceiver 120, to send the encoded command and control message 115 generated in response to the PIC pressing a button on a software interface.

The embodiment described in FIG. 4 further allows for a third-party emergency action. Currently, a UTM (Unmanned Traffic Management) system is being implemented by the Federal Aviation Administration (FAA), National Aeronautics and Space Administration (NASA), and the industry, for controlling operations of unmanned aircraft. Authorities, emergency services, and law enforcement have access to the information about a mission of an unmanned aircraft, to have a chance to warn other airspace users, and perform various actions as required. This is shown in FIG. 4 as the authorities control station 130 being in communication with the aircraft 100 via yet another ADS-B communication link 137 between another ground transceiver represented as Authorities Control Station (ACS) transceiver 136 at the authorities ground station 130 and the UA transceiver 122, which allows the authorities to perform the emergency action in case the PIC is not responding to the emergency situation.

In one embodiment, the authorities may decide to generate, using the control and processing system 134a, an authority action encoded flight control message 133 to be transmitted over a link 135 from the authorities control and processing system 134 to the ACS transceiver 136, which is further transmitted as the transmitted encoded flight control message through the ADS-B communication link 137. The transmitted encoded flight control message is received by the UA transceiver 122 at the UA 100 and provided via communication link 123 to the onboard control and processing system 124. The contents of the received encoded flight control message are processed by the onboard control and processing system 124, the acknowledgement message is sent back to the ground station, followed by a control action given to the autopilot 104 to execute a desired emergency maneuver.

In one embodiment, the encoded command and control message 133 has a higher priority than other communications between the ground control station 102 and the aircraft 100. In an embodiment of the present invention, the onboard control and processing system 124 decodes the received encoded command and control message with a pair of unique keys to recover the command and control message represented on UA side as emergency flight command 125 which corresponds to the control action given by the authorities ground control station 130. The emergency flight command 125 is provided to the autopilot 104 to execute the desired emergency maneuver.

Although the present embodiments have described the communication between the ground control station 102 and the authorities control station 130 with a single unmanned aircraft 100, it should be understood that a single ground station 102 may control one or more unmanned aircraft, in a similar fashion by communicating with respective aircraft using encrypted messages that are generated by using encryption keys that are specific to each of the aircraft and ground station for unicast transmission or by using a group key specific to a group consisting of one or more unmanned aircraft and the ground station for multicast transmission. Similarly, a single authorities control station 130 may control one or more unmanned aircraft, in a similar fashion by communicating with respective aircraft using encrypted messages that are generated by using encryption keys that are specific to each of the aircraft and ground station codes. Similarly, PIC and authorities ground stations may have similar set of commands which allows to communicate between their ground stations, acknowledge receiving and decoding the message, etc.

Figure 5A:
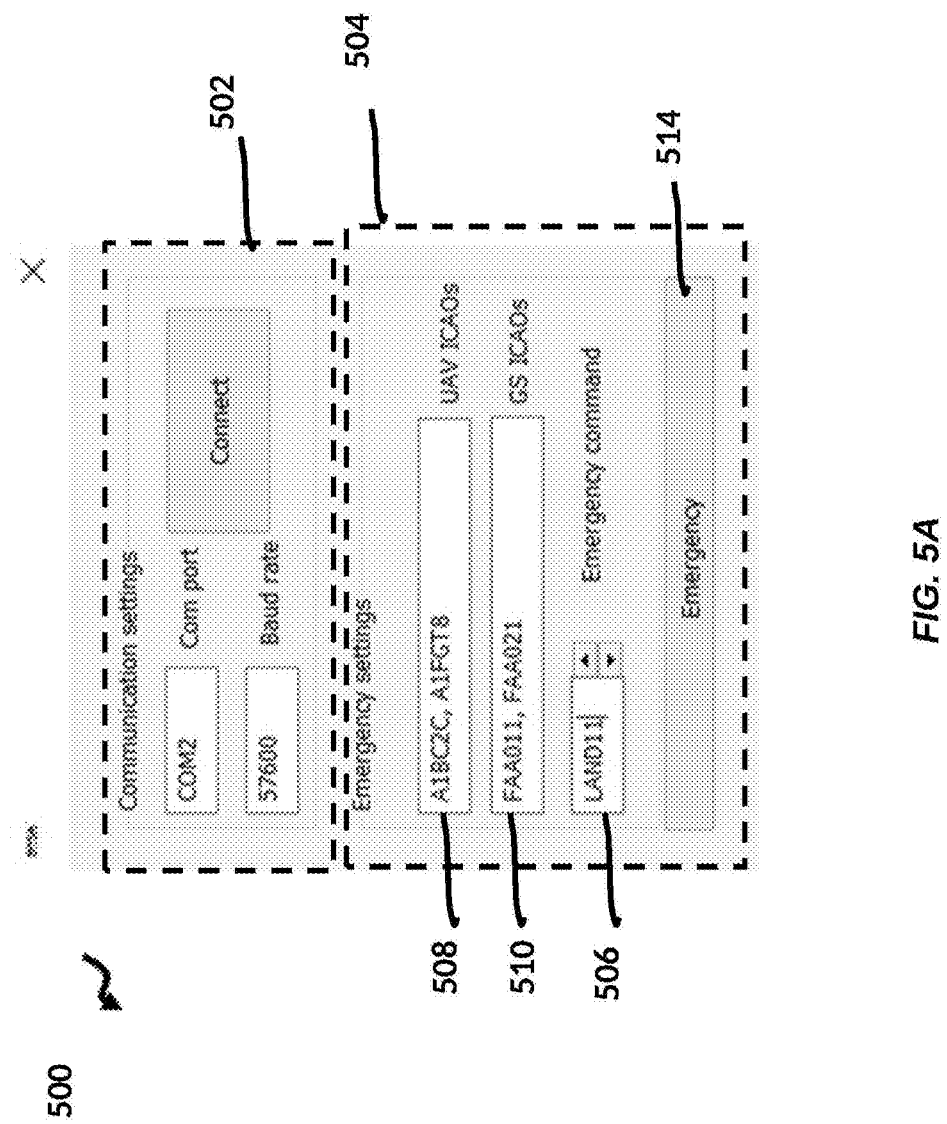
FIG. 5A illustrates a graphical user interface for selecting command for transmission according to one embodiment of the invention.

An example of a graphical user interface 500 for the control and processing system 132 is given in FIG. 5A for entering commands to send to UA 100 or to a group of aircraft. In one embodiment of the present invention, communication between the control and processing system 132 of ground control station 102 and the GS transceiver 120 (FIG. 4) is determined by the "Communication settings" window 502 in FIG. 5A. Both GS transceiver 120 and UA transceiver 122 are assigned respective specific International Civil Aviation Organization (ICAO) numbers, which however are not limited, and any other unique identifiers could be also used. The system needs to set ground station and/or aircraft ICAO numbers (or any other unique identifiers) 510 and 508, so that it can distinguish to which transmitters command and control messages are to be sent. The most suitable emergency command 506 may then be selected or chosen by the PIC depending on the situation. An execution of the emergency command 506, pressing the button "Emergency" 514, results in a command and control message such as an emergency flight command being transmitted to the UA 100 according to a method of the invention. In one embodiment, after decoding the received encoded command and control message with the pair of unique keys at the UA 100, communication from the onboard control and processing system 124 to the autopilot 104 in FIG. 4 is initiated to forward the retrieved emergency flight command to the autopilot 104.

In one embodiment, the emergency command 506 field can comprise six characters that can include both letters and numbers representing a selected command and control message that PIC intends to send to the target entity. In a further embodiment, different strings with different number of characters and composition may be implemented to represent the command and control message to be entered on emergency command 506. Thus, several flight control commands may be chosen as emergency maneuvers by the PIC, e.g. loitering, hovering, emergency land, various collision avoidance maneuvers—turns, altitude change etc. An emergency maneuver may be selected as shown in the emergency command 506 in FIG. 5A, assuming commands "KILL01", "LAND02" etc., in the window 206 indicate a certain maneuver.

Although in FIG. 5A of this description a software interface is shown, other interfaces to input the PIC command and control messages can be used within the scope of the invention.

Figure 5B:
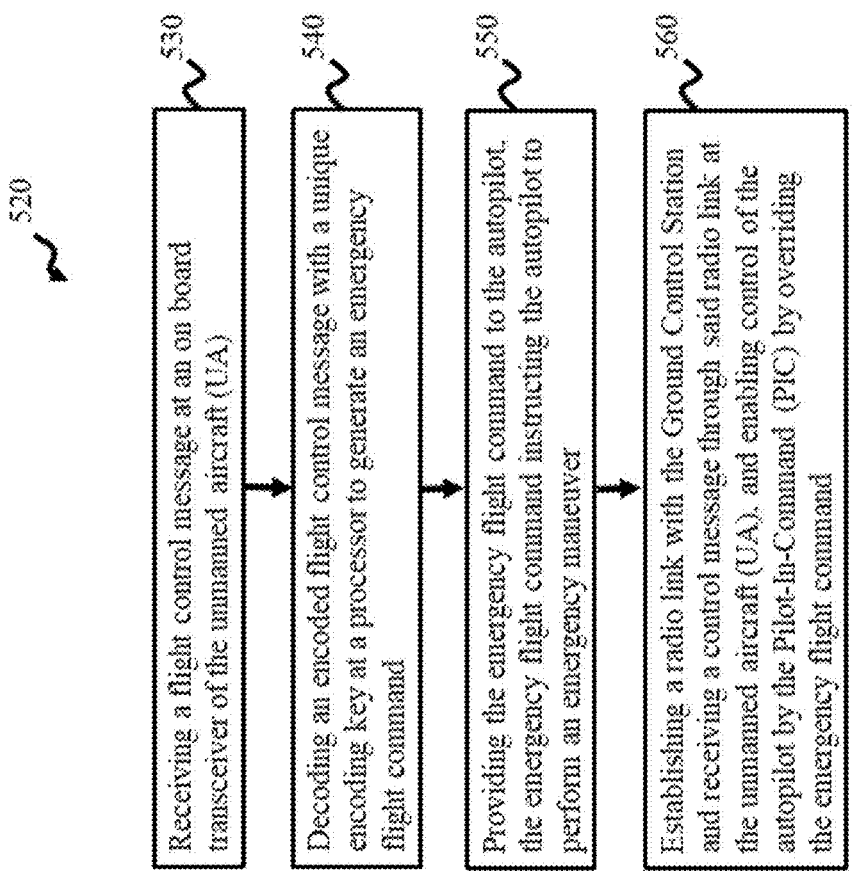
FIG. 5B illustrates a method for receiving communication messages at an aircraft from a Ground Control Station of an embodiment of the invention followed by further actions.

FIG. 5B illustrates a generic operation at the aircraft 100, including a method 520 for receiving the encoded flight control message at UA transceiver 122 of the UA100 (box 530), decoding the encoded flight control message with the pair of unique encryption keys at the onboard control and processing system 124 to retrieve the emergency flight command (box 540), sending an acknowledgment message back to the ground station 102, and providing the emergency flight command to the autopilot 104 instructing the autopilot 104 to perform an emergency maneuver (box 550). In one embodiment, once the radio link to the ground station is re-established, the onboard emergency processing system enable the PIC to take back the control by overriding the emergency flight control commands received from the authorities ground stations (Box 560). Alternatively, the authorities ground station 130 has priority over the PIC and will need to relinquish control for the PIC to take back control of the UA 100.

Figure 6:
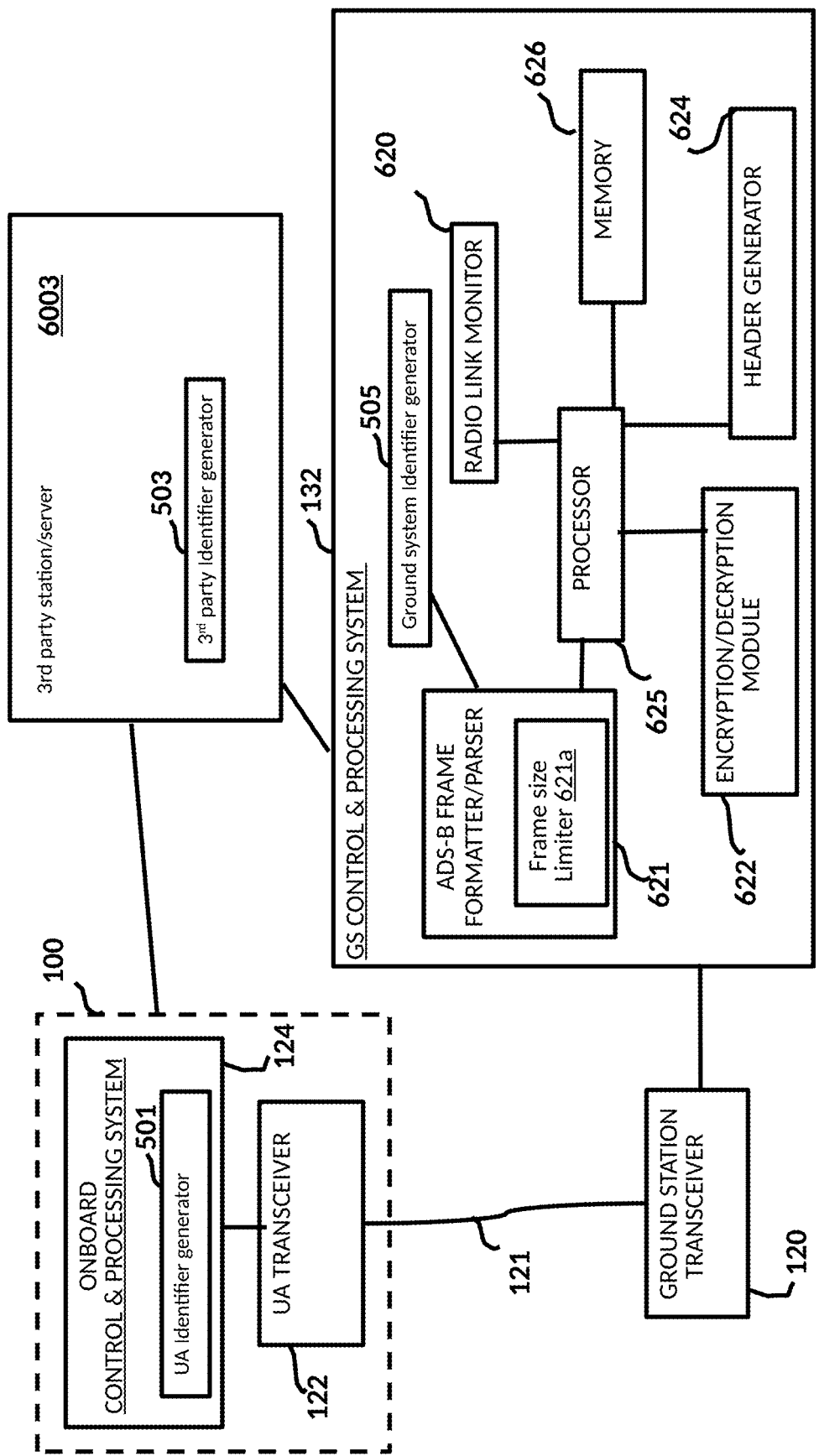
FIG. 6 illustrates an architecture of the GS control and processing system.

FIG. 6 shows an expanded diagram for the system 10 of FIG. 3 with the control and processing system 132 shown in greater detail, and where certain components not necessary for the description of this embodiment have been omitted so not to obscure the description. Operations for emergency control in situation of link loss situation will be described from the perspective of the ground station 102 however the same components and functionalities are present in the control and processing system 134 of the Authorities Control station 130.

The UA identifier generator module 501 is located in the onboard control and processing system 124 of the UA 100. The $3^{rd}$ party identifier generator module 503 is located in the $3^{rd}$ party station/server 6003, and the ground system identifier generator module 505 is located in the GS control and processing system 132, and cooperates with the ADS-B frame formatter/parser 621.

In one embodiment, the UA 100 includes an Onboard control and processing system 124 to be able to communicate with the ground station 102 or other aircraft implementing this invention. The components and functionalities of the UA Onboard control and processing system 124 are the same as for the GS control and processing system 132.

Additionally, the communication method and system disclosed herein apply to non-emergency situations and can be applicable to any bidirectional communication between the ground station 102 or Authorities Control station 130 and one or more aircraft.

As disclosed previously, the ground station 102 communicates with the unmanned aircraft 100 primarily through the radio link 112 and, upon loss of that radio link 112, switches to the ADS-B UAT link 121 to transmit command and control (C&C) messages. A C&C message is defined and used in the present application in a broad sense and can be any message transmitted through the communication method and system disclosed in this application, and can be flight control commands, emergency commands and other PIC control and informational messages.

As shown in FIG. 6, the e ground station (GS) 102 includes the ground station transceiver 120. In this embodiment, the GS transceiver 120 is a Universal Access Transceiver (UAT) for transmitting ADS-B frames generated from the GS control and processing system 132. The GS control and processing system 132 comprises a link monitoring system 620 for monitoring the radio link 112 (shown in FIG. 3), and upon detection of a link loss alerts a PIC for taking control and starting the emergency operation mode when needed.

The GS control & processing system 132 at the ground control station 102 further comprises a memory 626 storing code for performing operation of the control and processing system 132 to be executed by the processor 625. The control and processing system 132 initiates a process for transmitting an encrypted message or command from the ground control station 102 to the UA 100.

The processor 625 of the GS control and processing system 132 presents an interface to the PIC to interact with the GS control and processing system 132. Such interface can be the graphical user interface 200 disclosed in FIG. 5A. The PIC can use the graphical user interface 200 to enter its command and the processor 625 initiates the generation of the ADS-B UAT C&C message corresponding to that command according to the principles of this invention. In this embodiment, the processor 625 after receiving the command entered through the GUI 200, interacts with the encryption/decryption module 622 to encrypt the C&C message.

The encryption/decryption module 622, on the transmit side applies a 2-layer encryption method to generate the encrypted C&C message. On the reception side the encryption/decryption module 622 deciphers the encrypted C&C message to recover the corresponding message. The operation of the encryption/decryption module 622 will be described below with regards to FIGS. 10A and 10B.

The control and processing system 132 relies on a Header Generator 624 to generate a header and on the ADS-B frame formatter/parser 621 to form an ADS-B UAT frame carrying the encrypted C&C message according to the principles of the invention. The ADS-B UAT frame thus formed comprises a header portion and a payload portion which includes a sub-header and the encrypted C&C message.

The ADS-B UAT frame of the present invention is formatted using the same frame structure as a standard ADS-B UAT frame, making this invention backward compatible with the standard ADS-B UAT frame. However, new message types and methods to package the messages into an ADS-B UAT frame are introduced in the current disclosure.

Figure 7A:
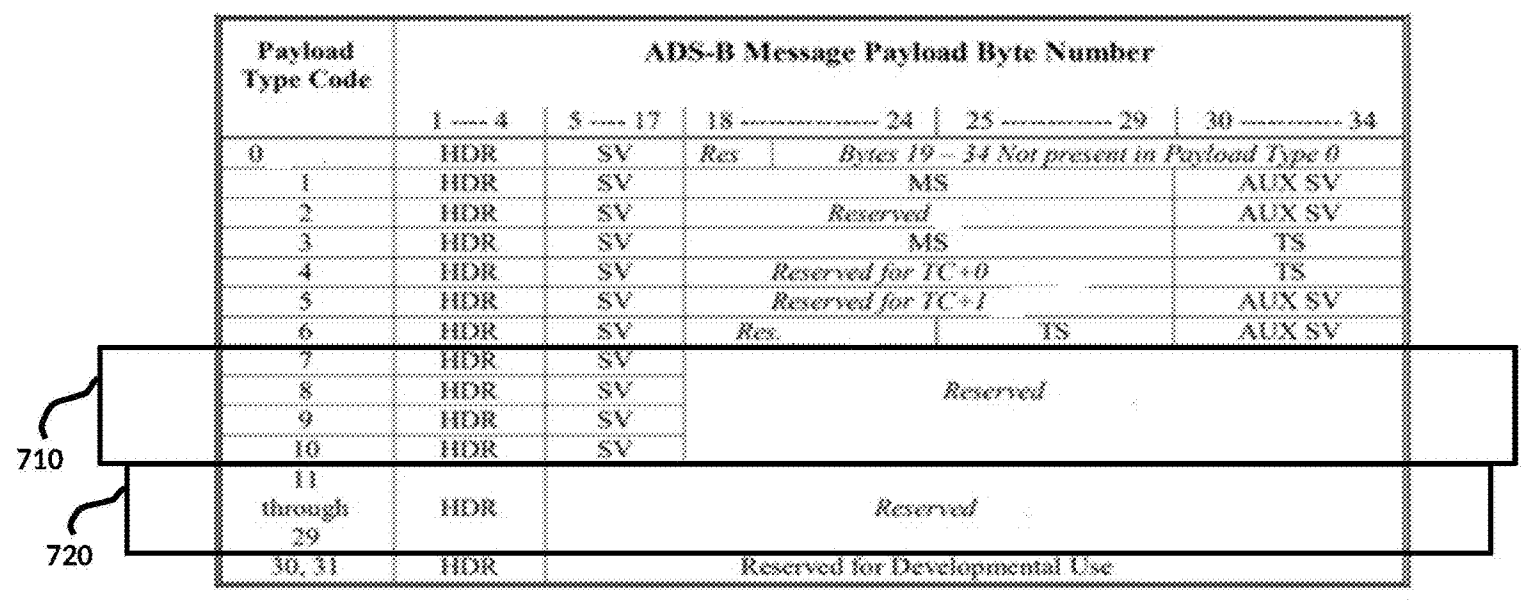
Figures 7B, 7C:
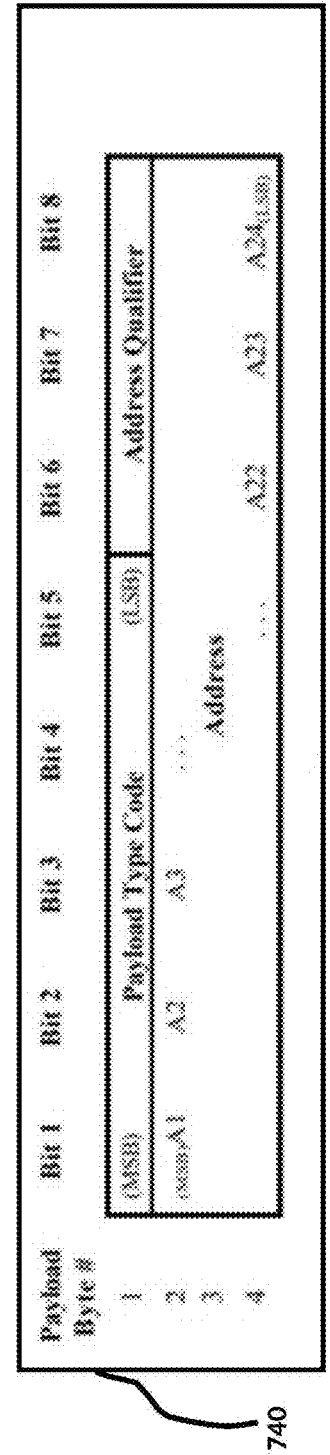
FIG. 7B illustrates a table showing the different address qualifiers and corresponding types of an ADS-B UAT frame.
FIG. 7C illustrates the composition of an ADS-B UAT header.
Figure 8A:
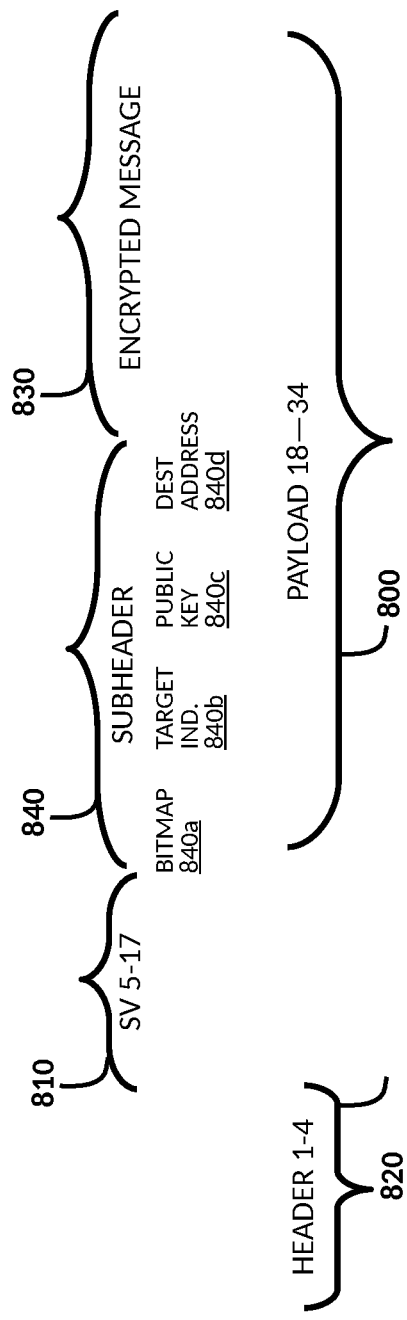
FIG. 8A illustrates the frame structures according to a first embodiment of the invention.
Figure 8B:
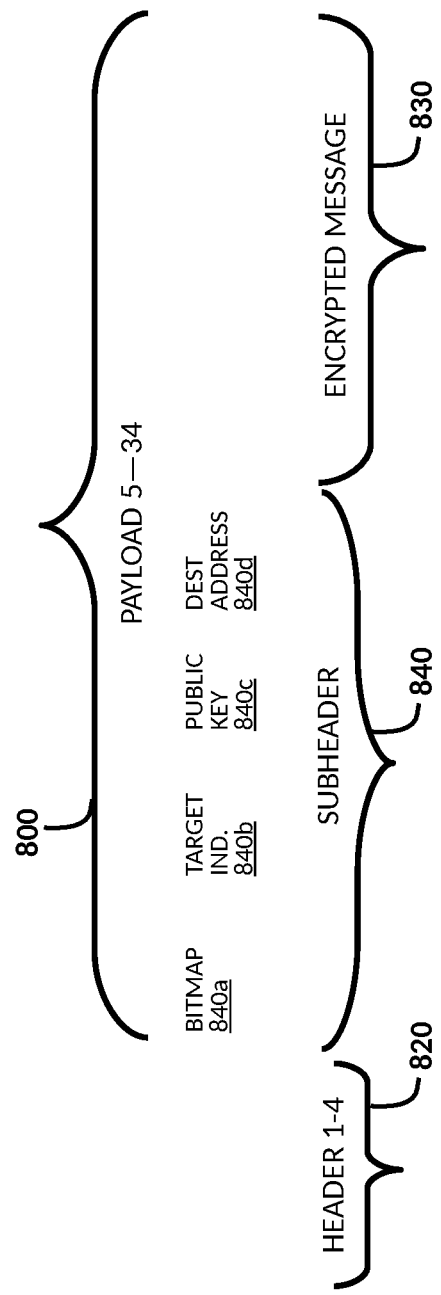
FIG. 8B illustrates the frame structures according to a second embodiment of the invention.

The description of the Header generator 624 and the ADS-B frame formatter/parser 621 will be based on FIGS. 7A, 7B and 7C and on FIGS. 8A and 8B, respectively.

As shown in FIG. 7A, ADS-B-UAT define potentially 32 messages (0-31) identified by the payload type code, however in reality only 11 (0-10) messages are currently defined.

Figure 8C:
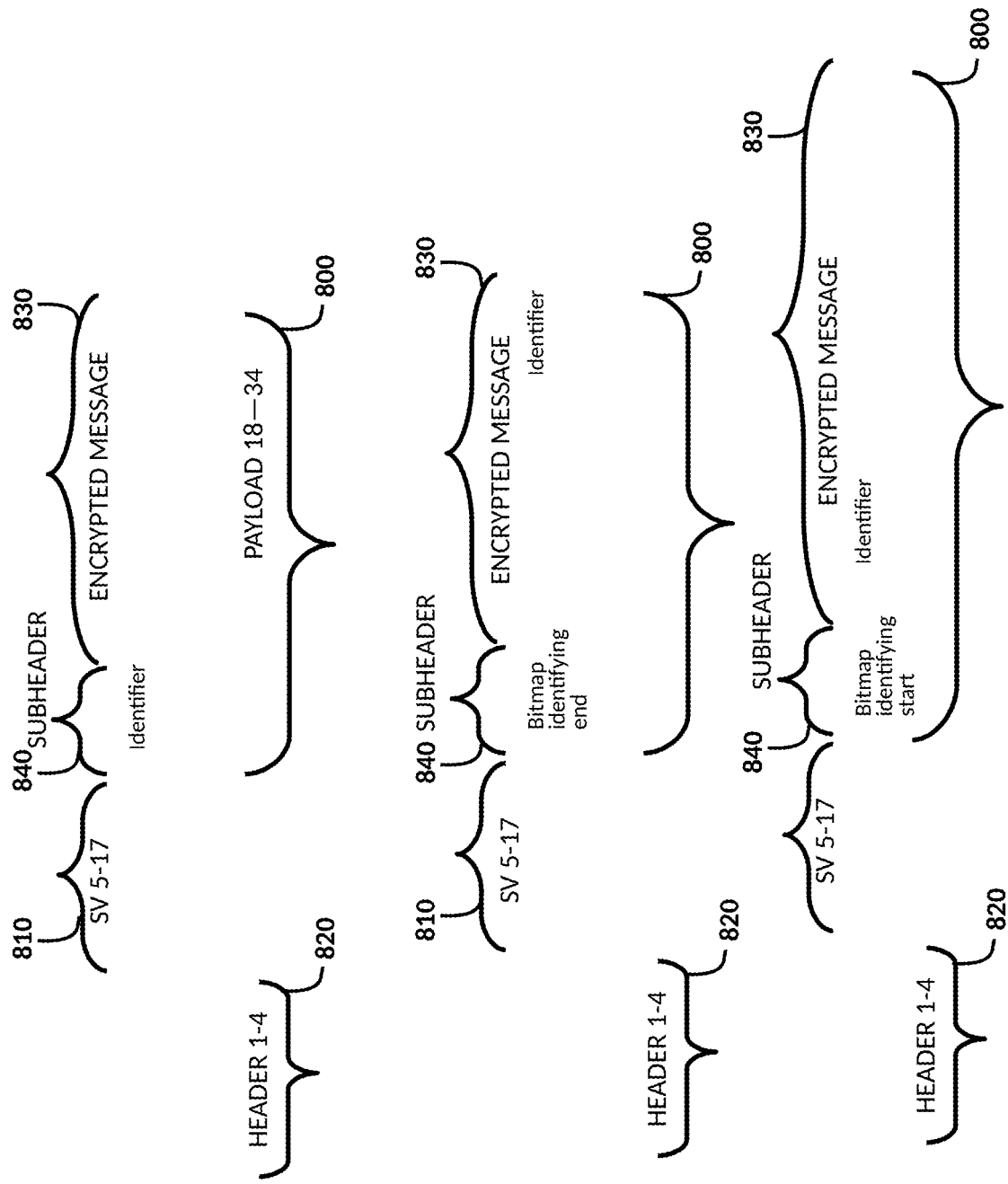
FIG. 8C illustrates the frame structures according to a third embodiment of the invention.

The ADS-B UAT frame structure has a 4-byte header, and a message payload having a state vector (SV) 810, shown on FIGS. 8A-8C, which is the aircraft position information and additional information field such as reserved bits and mode status (MS). In other words, for the defined messages, which are 0-10 messages, they all include a state vector (SV), which has position/velocity information, as per standard ADS-B UST message 0-10. The state vector, SV, or SV 5-17, contains a position, velocity and other state information of a transmitting aircraft. This is a standard designation, and is how aircraft that carry ADS-B share their location with other aircraft.

Payload types 7-10 define messages with header field and SV field along with reserved bits (element 720). Payload types 11-29 are reserved for future use and are comprised of the header and of the entire payload fields (element 730) reserved for future needs and are referred herein as reserved messages. Messages 30, 31 are meant for developmental use (for example, to test a new message structure).

The present invention uses these undefined or reserved bits (element 710) of payload type 7 to 10 or reserved messages (element 720) of payload types 11-29 to introduce new message types and thus new functionalities not originally contemplated by ADS-B UAT while at the same time preserving the header structure and payload structure of the ADS-B UAT to maintain compatibility with devices not implementing the present invention.

The header of the ADS-B UAT 740, as shown in FIG. 7C, contains the following information: payload type code, address qualifier, and address. The first 5 bits of Byte 1 of the header are used to encode the payload type while the last 3 bits of Byte 1 are used to encode an address qualifier and the remaining 3 Bytes (or 24 bits) are used to encode the address.

Payload type code is the number from 0 to 31 shown in FIG. 7A. Address is a 24-bit address used in conjunction with address qualifier. Typically for an aircraft, this address is a 24-bit ICAO number assigned to each aircraft upon its registration. This number is programmed into the UAT unit, and it is illegal to modify it. Address qualifier, in simple terms is what type of target the message is coming from.

FIG. 7B shows all possible types of address qualifiers. There are reserved address qualifiers (RAQ) "110" and "111" represented in FIG. 7B as elements 730*a* and 730*b* respectively which are the binary addresses for reserved types 6 and 7, respectively of FIG. 7B. These RAQ 730*a* and 730*b* have been used in the embodiments of the invention to indicate that the message is coming from an entity (ground station or aircraft) implementing the present invention and in communication with the aircraft in question.

As an example, the RAQ 730*a* for the binary address qualifier "110" can be used to indicate that the message is transmitted by a ground station entity implementing this invention while the 111 RAQ 730*b* for the binary address qualifier "111" is used to indicate that the message is coming from an aircraft entity implementing this invention, or vice versa. The use of these two reserved binary address qualifiers "110" and "111" indicates to its recipient a new message type corresponding to the C&C message and therefore an ADS-B UAT frame with such address qualifier carries a C&C message. The use of the two reserved binary address qualifiers "110" and "111" allows the system to define a new message type within the defined payload types of the existing ADS-B UAT standard.

In this embodiment, the reserved address qualifier is also used to indicate that the corresponding message should be interpreted according to the principles of the current invention, and therefore a standard ADS-B UAT recipient would not be able to interpret the message as reserved address qualifiers "110" and "111" are currently not defined in the ADS-B UAT standard.

In this embodiment, the Header Generator 624 creates the header 820 of the ADS-B UAT frame according to the principles described above and applies the RAQ "110", as an example, in the last 3 bits of the first Byte of the header 820 as shown in FIG. 7C.

The Header Generator 624 on the receiving side reads the header 820 and determines its content to identify the message type being received.

The ADS-B UAT frame formatter/parser 621, in one embodiment, uses the reserved Bytes 18-34 of an ADS-B message identified by one of the payload types 7-10 (element 710 of FIG. 7A) to transmit the encrypted C&C message.

The ADS-B UAT frame structure according to this embodiment is shown in FIG. 8A. The payload 18-34 identified as element 800 is subdivided into 2 sections a sub-header section 840 and an encrypted message section 830. The sub-header section 840 is comprised of 4 fields.

The first field 840*a* is a 4-bit Field of Byte 18 which contains a bitmap for indicating if the following 4 fields have content associated with them. An example bitmap of "1100" means that only the 2 fields following the bitmap field have field value in the current message, namely the target indicator and the public key of the transmitting entity. This bitmap "1100" can be transmitted periodically or frequently by a transmitting entity to advertise its public key so that aircraft or ground stations around can see the transmitting entity and can then send encrypted messages to the transmitting entity, when required.

The second field 840*b* of the sub-header 840 is a 1-bit field of a Target Indicator for indicating whether the message being transmitted is destined to a group or to an individual entity such as an aircraft or a ground station.

The third field 840*c* is the public key of the transmitting entity which is in this embodiment of FIG. 6 the ground station. The size of this third field 840*c* is set equal to a key size which can be 48 bits or any suitable size. Setting a length of an encryption key is well known to those skilled in the art.

The fourth field 840*d* contains a Destination Address which can be a Unique Identifier to whom this message is addressed (Group name or Individual name—e.g. ICAO). When the target indicator indicates a group destination, this field will contain a group name and when the target indicator indicates an individual destination, this field will contain an individual name. The presence of the destination address allows aircraft receiving this message to check first whether the message is addressed to them before decrypting the encrypted message and therefore will not waste computational resources trying to decrypt the message.

FIG. 8C illustrates the frame structures according to a third embodiment of the invention. Namely, FIG. 8C further shows other implementations of the ADS-B UAT frame structure, whereby the Unique Identifier may be: 1) part of the sub-header 840, 2) may be part of the encrypted message 830, or 3) may be partially part of the sub-header 840 and partially part of the encrypted message 830.

In general, a bitmap can identify the start of the message or the end of the message. A bitmap will identify a start of the message, if the identifier from FIG. 8C is at the beginning of the encrypted message, and the bitmap will identify the end of the message, if the identifier is at the end of the encrypted message. FIG. 8C illustrates the requirement for a bitmap 1100 to identify a start of the message and another bitmap to identify an end of the message.

In one embodiment, the UA identifier generator 501, the 3$^{rd}$ party identifier generator 503, and the ground system identifier generator 505, otherwise known as the identifier generator modules 501, 503, 505, generate a destination address 840*d* that is written in the sub-header 840, as shown in FIGS. 8A-8B.

In another embodiment, the identifier generators modules 501, 503, 505 use a known ICAO aircraft type designator, which is typically assigned to aircraft upon its registration. An ICAO aircraft type designator, or ICAO number, is a two-, three- or four-character alphanumeric code designating an aircraft type, or sub-type, that may appear in a flight planning. The ICAO numbers are defined by ICAO organization, and are published in the ICAO's Aircraft Type Designators document. In other words, the ICAO number belongs to a receiver aircraft, e.g. ACT299, whereby the ICAO address is assigned to the specific ADS-B transmitter on the aircraft.

Figure 8D:
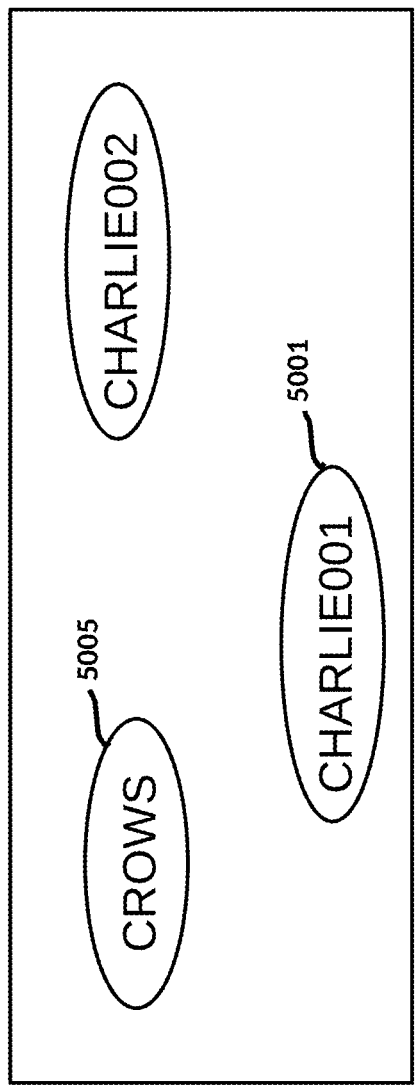
FIG. 8D is a schematic diagram illustrating generated "code numbers" for unicast and multicast transmission.
Figure 8E:
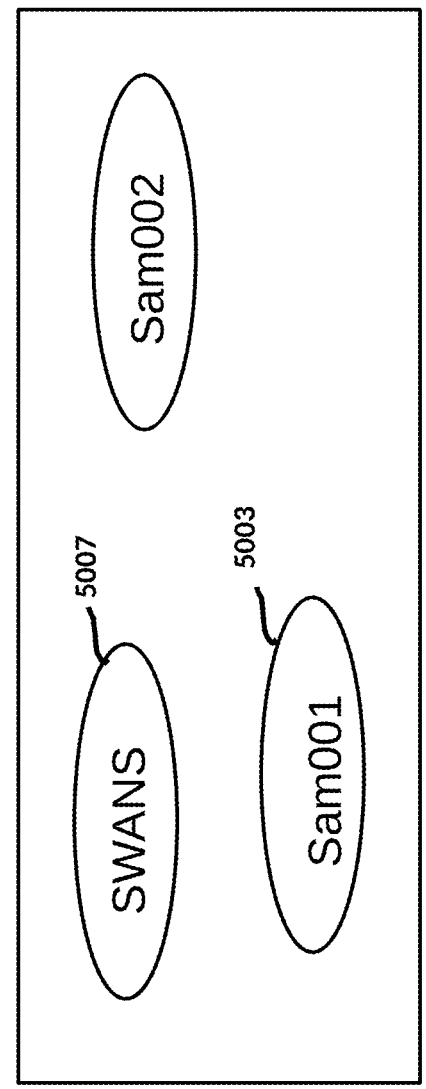
FIG. 8E is another schematic diagram illustrating generated "code numbers" for unicast and multicast transmission.

FIGS. 8D and 8E illustrate examples of generated "code numbers" for unicast and multicast transmission. In another embodiment, the identifier generators modules 501, 503, 505 generates a unicast "code number" for unicast transmission, known only to the transmitter and receiver entities. In FIG. 8D, an example of such a "code number" is indicated as "CHARLIE001" by reference numeral 5001, and in FIG. 8E, another example of such a code is indicated as "Sam002" by reference numeral 5003.

In yet another embodiment, the identifier generators modules 501, 503, 505 generates a multicast "code number" for multicast transmission, known to a group of receiver aircraft. In FIG. 8D, an example of such a "code number" is indicated as "CROWS" by reference numeral 5005, and in FIG. 8E, another example of such a code is indicated as "Swans" by reference numeral 5007.

The information used by the identifier generators modules 501, 503, 505, such as the ICAO number or "code number", which may also be used as an identifier, and which may be supplied from a database 6001 that both transmitter entities 9001 and receiver entities 8001 have access to. The database 6001 may be stored on a processor 7001 of a computer, which may be located on both the receiver entities 8001 and transmitter entities 9001. The database 6001 contents and "code numbers" can be time-limited, or permanent, or a combination of time-limited and permanent.

Figure 8F:
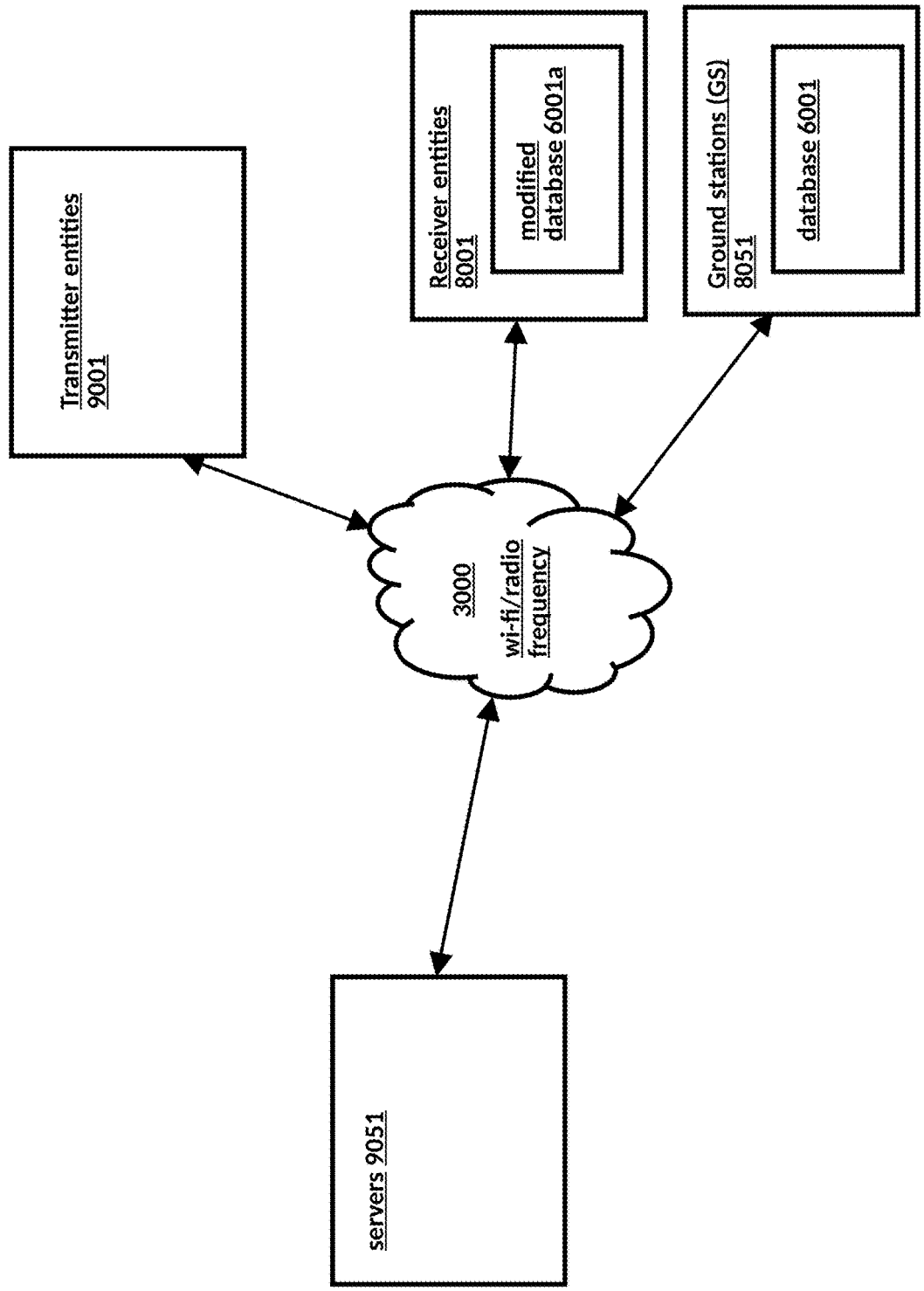
FIG. 8F is a schematic diagram illustrating the way database information may be shared between between transmitter and receiver entities, and servers and ground stations (GS).
Figure 8G:
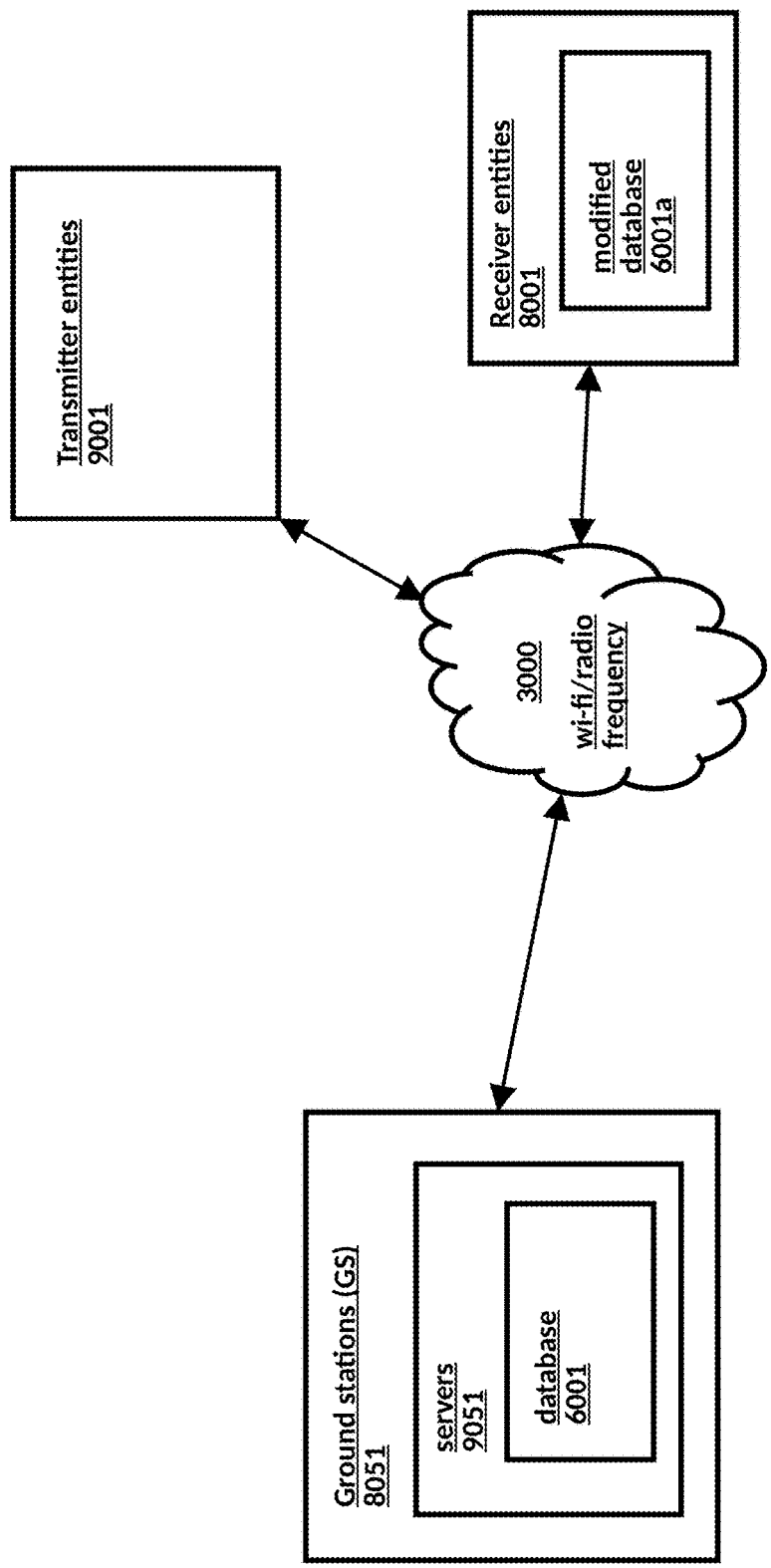
FIG. 8G is a schematic diagram illustrating another way database information may be shared between between transmitter and receiver entities, and servers and ground stations (GS).

FIGS. 8F and 8G are schematic diagrams illustrating the way information in a database 6001 may be shared between between transmitter entities 9001 and receiver entities 8001, and servers 9051 and ground stations (GS) 8051. As shown in FIGS. 8F and 8G, the database 6001 may be modified before a flight, or take-off, and the modified database 6001*a* could be uploaded to a memory storage device of the receiver entities 8001 and transmitter entities 9001, e.g. with the use of wi-fi/radio frequency 3000. Furthermore, new receiver entities 8001*a* or transmitter entities 9001*a* may be added to the memory storage of the database 6001 "ad-hoc", after which the further modified database 6001*a* may be transmitted to all participants, or the receiver entities 8001 and transmitter entities 9001 e.g. with the use of wi-fi/radio frequency 3000.

The transmitted message to the receiver entities 8001 and transmitter entities 9001 may require an acknowledgment message. If an acknowledgment message is required and is not received by the receiver entities 8001 within a perdetermined amount of time, a repeat transmitted message is sent. In another implementation, the transmitted message may not require an acknowledgment message.

The database 6001 may be created by aviation authorities, such as the ICAO organization, or by other third parties, and can be stored on ground stations (GS) 8051 or servers 9051, where the ground stations (GS) and servers are separate, shown in FIG. 8F, or ground stations (GS) 8051 could be servers 9051, shown in FIG. 8G. The database 6001 may be Oracle, MySQL, MS Access, or custom tables.

The sub-header 840 is disclosed here to comprise 4 fields, but those skilled in the art can readily devise a different number of fields without departing from the invention. As an example, only three fields could be used by omitting the destination address field 840*d* while still maintaining the functionality to convert the ADS-B broadcast transmission protocol into a unicast or multicast transmission protocol, because of the encryption of the message with a unique set of keys associated to the 2 entities in communication. The omission of the destination address could be considered for the purpose of maximizing the size of the encrypted message. Alternatively, an additional fifth field may be inserted in the sub-header 840, to provide additional information or additional functionalities as required.

In another embodiment, the public key field 840*c* can be omitted as well from the sub-header 840. In this embodiment, all entities in communication have the public key of the other entities in communication. This public key can be transmitted when no message is being sent corresponding to bitmap case of "1100" described above to allow all parties to learn and store the public key of the other parties sharing their public key. The public key field 840*c* can be omitted by transmitting an ADS-B message with the bitmap equal to "1011" or "1001" when the destination address is omitted. Other combinations can be devised without departing from the invention.

The field 830 is for the encrypted C&C message generated by the encryption/decryption module 622. The ADS-B frame formatter/parser 621 can then form the ADS-B UAT frame by composing all these fields including the header portion generated by the header generator 621 into a frame as shown in FIG. 8A.

In one embodiment a frame size limiter 621a is present within the ADS-B UAT frame formatter/parser 621 to ascertain that an ADS-B UAT frame thus formed by the ADS-B UAT frame formatter/parser 621 has a length equal to or less than the length of a standard ADS-B UAT frame as specified in standard specifications, which is currently 34 Bytes. Limiting the frame size can be done by adjusting the size of the encryption key, by omitting certain fields within the sub-header 840 as described above, by using different encryption techniques, by encrypting only part of the message, by inserting an index of the message instead of the entire message, or various other means.

In an alternative embodiment, the ADS-B frame formatter/parser 621 uses one of the reserved messages defined by payload types 11-29 (element 720). The frame format according to this embodiment is shown in FIG. 8B and presents more bytes for transmitting the messages as the payload extends from byte 5 to byte 34 compared to the frame format of FIG. 8A. FIG. 8B and FIG. 8A have the same fields however the payload size of FIG. 8B is longer therefore longer encrypted messages can be transmitted. Alternatively, FIG. 8B can be used to transmit additional sets of messages or longer encryption keys can be used to provide a more robust encryption and thus a more secure transmission.

Once the ADS-B UAT frame is formed, it is transmitted through the GS transceiver 120 and subsequently received by the Onboard UAT transceiver represented as UA transceiver 122 at the UA 100 which processes ADS-B frame through the Onboard control and processing system 124. The recovered C&C message is then forwarded to the autopilot 104 as described above to apply the command sent by the PIC. As stated above, the Onboard control and processing system 124 has identical functionalities as the GS control and processing system 13a and is as well provisioned to process messages transmitted by the GS control and processing system 132. In particular, it can read the header through its Header Generator and parse the frame. The ADS-B frame formatter/parser within the Onboard control and processing system 124, when receiving a frame, parses the frame to identify the 4 fields of the sub-header and to extract the key needed for deciphering the encrypted message.

In an alternative embodiment, a message indexing mechanism is used to transmit the C&C message. In this embodiment, all entities in communication have a list or menu of messages stored prior to communicating, or alternatively have access to the list of stored messages. Each message is indexed, therefore only indices of messages are communicated, thus a transmitting entity needs only to transmit an index of the message, and the receiving entity has a look up table to retrieve a message from the stored list with the index, corresponding to the index of the transmitted message. The index of the message, in this embodiment, is inserted within the encrypted message field 830. The message indexing mechanism may be used as a means to limit the size of the ADS-B UAT frame, because the size of the index is smaller than the size of the message itself. Exemplary values of indices may be numerical such as 1 to N, with each index corresponding to a message within the set of C&C messages that can be communicated between the transmitting and receiving entities. Other alphanumerical values or codes can be used as index as well.

The index of the message may be encrypted before being inserted in the encrypted message field 830. Alternatively, the message index may not be encrypted prior to inserting within the encrypted message field 830 before the transmission.

The GS control and processing system 132 can be a standalone processing system or integrated as part of the GS processing computer 106. GS control and processing system 132 can as well be implemented in hardware, in software or in combination thereof. Those skilled in the art can readily design a GS control and processing system 132 that can fulfill its functionalities described in the current disclosure. The GS control and processing system 132 may or may not comprise the processor 625. The GS control and processing system 132 may be only Software stored in the memory 626 for execution by another processor such as a processor within the GS processing computer 106.

Figure 9:
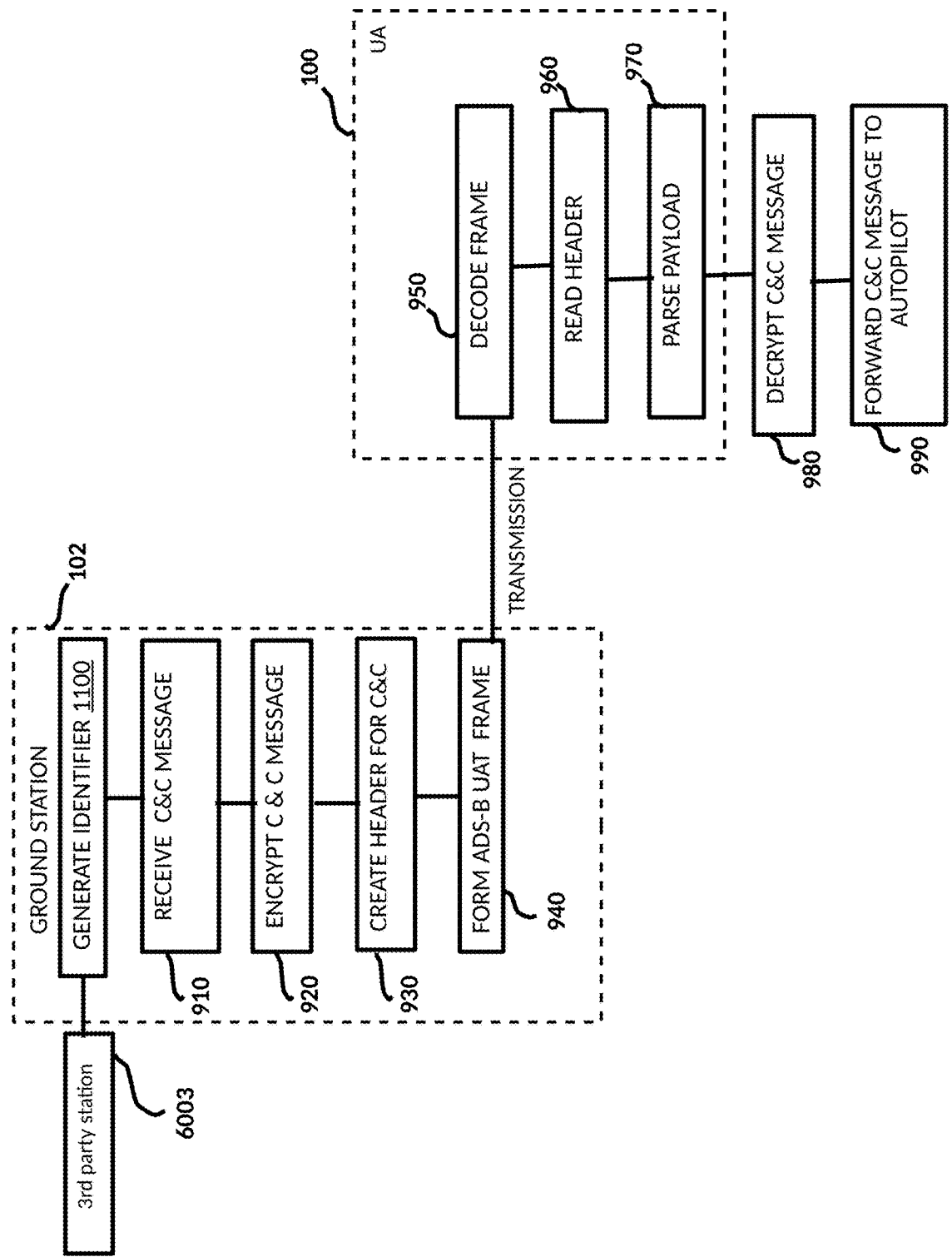
FIG. 9 illustrates a signal flow depicting the processing of a command and control message at transmission and reception.

FIG. 9 is a signal flow diagram showing a ground station 102 and an aircraft 100 when communicating according to an embodiment of the present invention. The $3^{rd}$ party station/server 6003 in cooperation with the ground station 102, performs the step of generating an identifier 1100. As can be seen from FIG. 9, the steps of decoding, reading and parsing occur on the UA 100. As described above when a PIC enters a command through the GUI 200, the C&C message is received by the GS control and processing 132 at step 910 and at step 920 the encryption module is called upon to perform an encryption according to the method of this invention that will be described with regards to FIG. 10A below. At step 930 a header 820 is generated as described above with respect to the Header Generator 624 of FIG. 6.

The ADS-B formatter/parser 621, at step 940 forms an ADS-B UAT frame as described previously. In one embodiment the ADS-B UAT frame is formatted according to the frame structure shown in FIG. 8A. Alternatively the frame is formatted according to the frame structure of FIG. 8B.

Once the frame is formatted, it is transmitted through the GS ADS-B transceiver 120 over the link 121 to the UA 100. At step 950 the frame is received and decoded at the UA 100. At step 960 the header 820 of the decoded frame is read by the Onboard Control and processing system 124 in the UA 100. As stated above the use of the binary "110" or "111" RAQ (element 730a or element 730b, respectively) indicates an operation according to the principles of the invention.

The Onboard Control and processing system 124 upon determining that the frame complies with the structure of this invention from the reading of the header 820, can start the parsing of the payload portion 800 of the ADS-B UAT frame using the ADS-B frame formatter/parser 621 (step 970). Based on the payload type code, the Onboard Control and processing system 132 can identify all the subfields within the payload 800 and ascertain through the Destination Address field 840d that the message is addressed to the UA 100. The Onboard Control and processing system 132 can then extract the public key of the sender to start the decryption of the encrypted C&C message within the encrypted message field 830 at step 980. The decryption operation will be described with regards to FIG. 10B. At step 990 the decrypted message is forwarded to the Autopilot 104 of the UA 100 to respond to the command conveyed by the C&C message as described above.

Figure 10B:
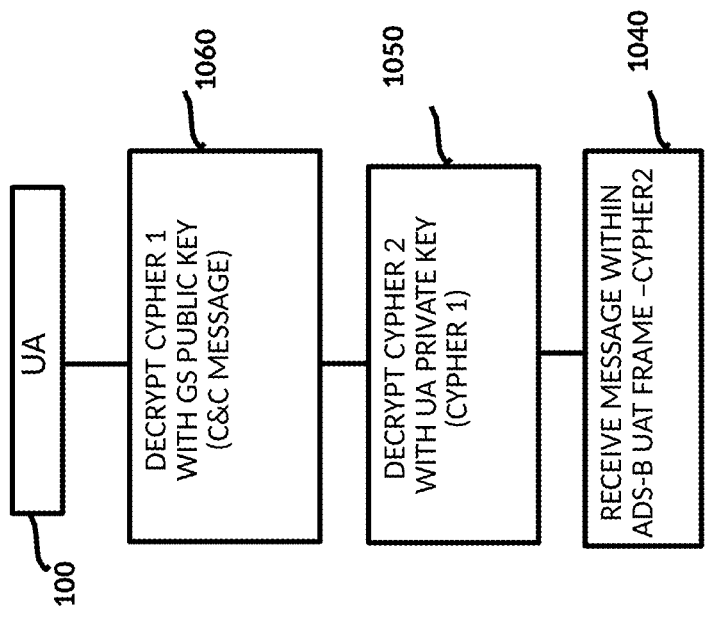
FIG. 10B illustrates a decryption operation of the command and control message.
Figure 10A:
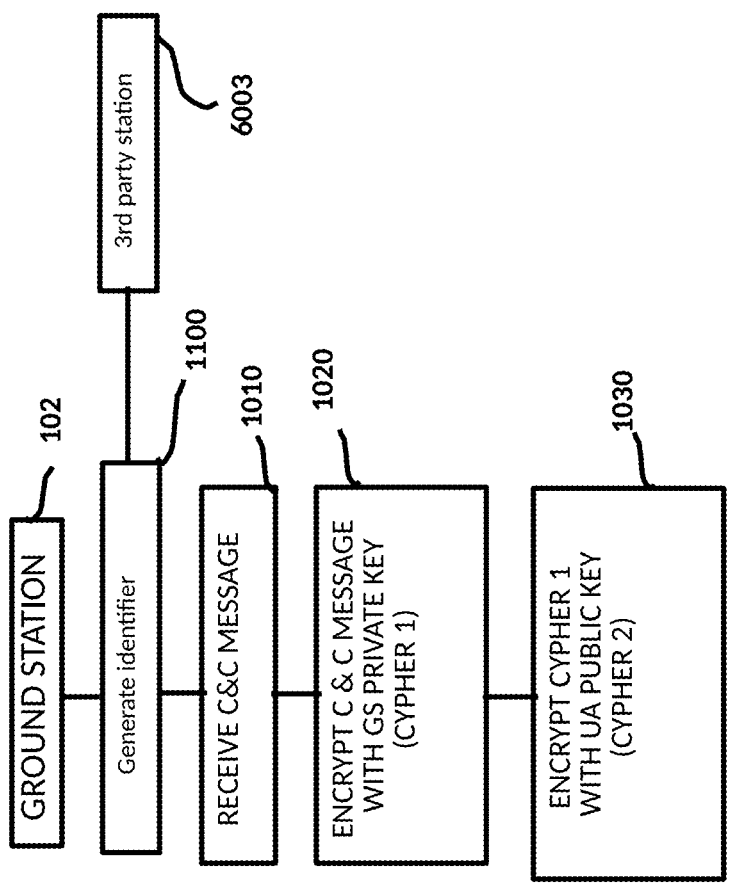
FIG. 10A illustrate an encryption operation of the command and control message.

FIGS. 10A and 10B describe the encryption/decryption operations according to an embodiment of the present invention. The encryption is based on a 2-layer encryption and will be described with reference to FIG. 10A. The $3^{rd}$ party station/server 6003 in cooperation with the ground station 102, performs the step of generating an identifier 1100. Then the C&C message received at step 1010 is encrypted with the GS private key at step 1020 for a first layer encryption referred to as CYPHER 1 and at step 1030 a second layer encryption is applied using the UA public key to form an encrypted message or CYPHER 2. The encrypted message or CYPHER is inserted in the encrypted message field 830 as part of forming the ADS-B UAT frame.

The decryption operation performed by the UA 100 is shown in FIG. 10B. The received encrypted message (CYPHER 2) within the ADS-B UAT frame at step 1040 is first decrypted with the UA private key to determine CYPHER 1 at step 1050. At step 1060 the GS public key retrieved from the Public key field 840c of the ADS-B UAT frame is used to perform the $2^{nd}$ layer decryption of CYPHER 1 to extract the C&C message.

According to an embodiment of the invention, both aircraft and ground control stations are equipped with 2 sets of encryption keys: public (short) and private (long). Public and private keys are computed beforehand, and could be assigned upon aircraft registration, prior to the specific mission or any other way known to those skilled in the art. Every user transmits its short key within the reserved bits of the ADS-B message as described above, therefore, those keys can be received and stored in the memory by any other entity.

The suggested asymmetric encryption method has a "space" advantage over other symmetric methods: it can be used to encrypt a message without the need to exchange a secret key separately. For example, Ground Station can send an encrypted message to the UA without any prior exchange of secret keys. GS just uses Aircraft's public key to encrypt the message and Aircraft decrypts it, using its private key. Considering the increase in air traffic, this approach is advantageous because less storage/memory is needed to store all the keys. When new user is added, it only needs a private and a public key, thus for n users, only 2n keys are needed. Complexity is O(n). As compared to symmetric methods, every time a new user is added to the system, it needs to share a new key with each previous user. For n users we have n(n−1)/2 keys needed. This is complexity O(n*n).

Specific issue with encrypting ADS-B messages is that ADS-B UAT messages are only 34 bytes long (FIG. 9). Asymmetric encryption methods, as suggested above, have a lot of advantages, but compared to symmetric methods do not guarantee not going over 34 bytes. Encrypting the whole ADS-B frame would require modifying existing technical standards to accommodate a new size of the ADS-B frame. The solution provided above through partial encrypting of the ADS-B frame allows to mitigate such issue and limit the ADS-B UAT frame as formed to 34 bytes. This encryption method is an efficient way of encryption of the specific field of ADS-B message considering small size of the ADS-B frame, while maintaining high security and being advantageous in large amount of air traffic.

In one further embodiment, the Onboard control and processing system 124 records various flight data for the unmanned aircraft 100, which is stored in a non-volatile memory for post flight analysis, or for post-recovery of the UA 100 in the case of a downed UA 100 from either intended or unintended flight termination. In a further embodiment, the UA transceiver 122 is equipped with back-up batteries to enable a continuous intermittent transmission of the location of a downed UA 100 for recovery.

In the method disclosed above, the step of carrying comprises carrying the encrypted message and the identifier on undefined messages of the ADS-B UAT frame having a payload type code between 30 and 31. The step of the carrying comprises carrying the encrypted message and the identifier on reserved fields of the ADS-B UAT frame having a payload type code between 7 and 10. The step of the carrying comprises carrying the encrypted message and the identifier on reserved messages of the ADS-B UAT frame having a payload type code between 11 and 29.

In the method disclosed above, the step of the forming the ADS-B UAT frame comprises generating the sub-header comprising one or more of: the identifier, a public key for the unique set of keys, a target indicator indicating one of a unicast and multicast transmission. The step of the inserting the encrypted message and the identifier into the payload portion comprises one of: inserting the identifier into the sub-header, and inserting the identifier into the encrypted message. The step of the inserting the encrypted message and the identifier into the payload portion comprises one of: inserting the identifier into the beginning of the encrypted message, and inserting the identifier into the end of the encrypted message. The step of the generating the identifier comprises generating the identifier before encrypting. The step of the generating the identifier comprises generating the identifier after encrypting. The step of the generating the identifier comprises obtaining the identifier by a third party.

In the method described above, the step of the forming the ADS-B UAT frame comprises: generating the sub-header comprising a bitmap indicating a start of the encrypted message, and generating the sub-header comprising another bitmap indicating an end of the encrypted message. The step of the generating the identifier comprises at least one of: generating the identifier at the first entity, generating the identifier at the second entity, and retrieving the identifier from a third party, in communication with the first and second entity. The step of the generating the identifier further comprises storing the identifier in a database in a memory device.

The method described above further comprises: updating the database, comprising adding new first and second entities, and removing selected existing first and second entities, and uploading the updated database to the first entity and the second entity using one of wi-fi and radio frequency. The step of the storing the database comprises storing the database in the memory drive on one of: the first entity, the second entity, a third party server in communication with at least one of the first entity and second entity, and another server hosted at the first entity, yet another server hosted at the second entity. The step of the limiting comprises limiting the ADS-B UAT frame not to exceed 34 bytes. Furthermore, the step of the compressing the message comprises at least one of: compressing the message before encryption, and compressing the message after encryption. The step of the encrypting the message comprises encrypting with the unique set of keys comprising a private key of the first entity and a public key of the second entity.

In the method described above, the encrypting step comprises one of the following: first encrypting the message with a first entity private key to generate a first encrypted message, and then encrypting the first encrypted message with a second entity public key to generate the encrypted message, and wherein said unique set of keys comprise the first entity private key and the second entity public key, first encrypting the message with a second entity private key to generate a first encrypted message, and then encrypting the first encrypted message with a first entity public key to generate the encrypted message, and wherein said unique set of keys comprise the first entity public key and the second entity private key. Furthermore, the message is one of the following: a command and control message, an emergency command, an information message, a message selected from a menu of predetermined messages. The step of the generating the identifier comprises generating a "code number" for one of: unicast transmission, known only to transmitter entities and receiver entities, and multicast transmission, known to transmitter entities and a group of receiver entities. The step of the generating the "code number" further comprises: sending an acknowledgment message from transmitter entities to receiver entities, and sending a repeat transmitted message if the acknowledgment message is required but not received by the receiver entities.

In the system described above, the computer readable instructions cause to insert the encrypted message and the identifier further cause the processor to carry the encrypted message and the identifier on undefined messages of the ADS-B UAT frame. The undefined messages of the ADS-B UAT frame have a payload type code between 30 and 31. The computer readable instructions cause to insert the encrypted message and the identifier further cause the processor to carry the encrypted message and the identifier on reserved fields of the ADS-B UAT frame. The reserved fields of the ADS-B UAT frame have a payload type code between 7 and 10.

In the system described above, the computer readable instructions cause to insert the encrypted message and the identifier further comprise the processor to carry the encrypted message and the identifier on reserved messages of the ADS-B UAT frame. The reserved messages of the ADS-B UAT frame have a payload type code between 11 and 29.

In the system described above, the identifier is one of: a destination address, an International Civil Aviation Organization (ICAO) number, and generating a "code number" for one of: unicast transmission, and multicast transmission. The sub-header comprises one or more of: the identifier, a public key for the unique set of keys, a target indicator indicating one of a unicast and multicast transmission.

In the system described above, the first entity and the second entity comprise at least as one of the following: the first entity is a ground station, and the second entity is one of an aircraft and a group of aircraft, the first entity is the aircraft, and the second entity is the ground station, the first entity is the aircraft, and the second entity is one of another aircraft and a group of other aircraft, the first entity is the another aircraft, and the second entity is one of the aircraft and the group of aircraft, the first entity is the ground station, and the second entity is another ground station. The identifier is inserted into the beginning of the encrypted message, and the identifier is inserted into the end of the encrypted message. Furthermore, the system described above comprises one of the following: the identifier is generated before encrypting, the identifier is generated after encrypting, the identifier is generated by a third party.

In the system described above, the sub-header comprises one of: a bitmap to indicating a start of the encrypted message, and another bitmap indicating an end of the encrypted message. The identifier is stored in a database in a memory device. In the system described above, the identifier is modified before a flight or take-off, thereby creating a modified identifier, and the modified identifier is uploaded to the second entity and the first entity using one of: wi-fi, radio frequency. In the system described above, the database is updated, comprising adding new first and second entities, and removing selected existing first and second entities, and the updated database is uploaded to the first entity and the second entity using one of wi-fi and radio frequency.

In the system described above, the database is stored in a memory device on one of: the first entity, the second entity, a third party server in communication with at least one of the first entity and second entity, and another server hosted at the first entity, yet another server hosted at the second entity. The frame size is limited not to exceed a length of a standard ADS-B UAT frame as specified in standard specifications. The ADS-B UAT frame is limited not to exceed 34 bytes.

In the system described above, a size of the unique set of keys for encryption is adjusted to result in the frame size not exceeding the length, another encryption technique is used, only part of the message is encrypted, the message is compressed, an index of the message is inserted in the payload, instead of inserting the entire message. The message is one of: the message is compressed before encryption, and the message is compressed after encryption.

In the system described above, the computer readable instructions further cause the processor to: encrypt the message with a first entity private key to generate a first encrypted message, and then encrypt the first encrypted message with a second entity public key to generate the encrypted message, and wherein said unique set of keys comprise the first entity private key and the second entity public key, encrypt the message with a second entity private key to generate a first encrypted message, and then encrypt the first encrypted message with a first entity public key to generate the encrypted message, and wherein said unique set of keys comprise the first entity public key and the second entity private key. The "code number" is one of: unicast transmission, known only to transmitter entities and receiver entities, and multicast transmission, known to transmitter entities and a group of receiver entities. The computer readable instructions causing to generate the "code number" further cause the processor to: send an acknowledgment message from transmitter entities to receiver entities, and send a repeat transmitted message if the acknowledgment message is required but not received by the receiver entities.

There is also described a communication network for unicast or multicast transmission via an Automatic Dependent Surveillance-Broadcast (ADS-B) transmission protocol, the network comprising: a first entity, a second entity, a system in communication with the first entity over the communication network, for carrying a message on a ADS-B Universal Access Transceiver (UAT) frame for transmission from the first entity to the second entity, the system comprising: a processor, and a memory device having computer readable instructions stored thereon for execution by the processor, causing the processor to: encrypt a message with a unique set of keys associated with the first entity and the second entity to generate an encrypted message, generate a header indicating an ADS-B frame type, generate an identifier for uniquely identifying the second entity, the identifier being known to the first and second entities, and form an ADS-B UAT frame comprising a header portion, and a payload portion comprising a sub-header, comprising: insert the header into the header portion, and insert the encrypted message and the identifier into the payload portion, thereby making the ADS-B UAT frame compatible with a standard ADS-B UAT frame, and transmit the ADS-B UAT frame to the second entity, thereby converting the ADS-Broadcast transmission protocol into a unicast or multicast transmission.

There is also described a communication network for unicast or multicast transmission via an Automatic Dependent Surveillance-Broadcast (ADS-B) transmission protocol, the network comprising: a network interface, a system in communication with a first entity and a second entity over the communication network via the network interface, the system carrying a message on a ADS-B Universal Access Transceiver (UAT) frame for transmission from the first entity to the second entity, the system comprising: a processor, and a memory device having computer readable instructions stored thereon for execution by the processor, causing the processor to: encrypt a message with a unique set of keys associated with the first entity and the second entity to generate an encrypted message, generate a header indicating an ADS-B frame type, generate an identifier for uniquely identifying the second entity, the identifier being known to the first and second entities, and form an ADS-B UAT frame comprising a header portion, and a payload portion comprising a sub-header, comprising: insert the header into the header portion, and insert the encrypted message and the identifier into the payload portion, thereby making the ADS-B UAT frame compatible with a standard ADS-B UAT frame, and transmit the ADS-B UAT frame to the second entity, thereby converting the ADS-Broadcast transmission protocol into a unicast or multicast transmission.

Methods and systems of the present invention can be applied in various environment including any navigating entity either airborne, seaborne or on the ground such as aerial, marine or ground transportation vehicles.

The communication can be as well bidirectional between ground station to a group of entities or to an individual entity or from a seaborne or airborne entity to a ground station or land vehicle. Different combinations and arrangement are contemplated under the current disclosure and are known to those skilled in the art.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing, data-control and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable flight control of unmanned aircrafts.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for unicast or multicast transmission via an Automatic Dependent Surveillance-Broadcast (ADS-B) transmission protocol, the method comprising:
   generating a message to be carried on an ADS-B Universal Access Transceiver (UAT) frame for transmission from a first entity to a second entity;
   encrypting the message with a unique set of keys associated with the first entity and the second entity to generate an encrypted message;
   generating a header indicating an ADS-B frame type;
   generating an identifier for uniquely identifying the second entity, the identifier being known to the first and second entities; and
   forming an ADS-B UAT frame comprising a header portion, and a payload portion comprising a sub-header, comprising:
   inserting the header into the header portion;
   inserting the encrypted message and the identifier into the payload portion; and
   limiting a frame size not to exceed a length of a standard ADS-B UAT frame of 34 bytes as specified in standard specifications;
   thereby making the ABS-B UAT frame compatible with a standard ADS-B UAT frame; and
   transmitting the ADS-B UAT frame to the second entity, thereby converting the ADS-Broadcast transmission protocol into a unicast or multicast transmission.

2. The method of claim 1 wherein the inserting the encrypted message and the identifier comprises carrying the encrypted message and the identifier on undefined messages of the ADS-B UAT frame.

3. The method of claim 1, the inserting the encrypted message and the identifier comprises carrying the encrypted message and the identifier on reserved fields of the ADS-B UAT frame.

4. The method of claim 1, the inserting the encrypted message and the identifier comprises carrying the encrypted message and the identifier on reserved messages of the ADS-B UAT frame.

5. The method of claim 1, wherein the generating the identifier comprises using one of:
   a destination address;
   an International Civil Aviation Organization (ICAO) number; and
   generating a "code number" for one of:
   unicast transmission; and
   multicast transmission.

6. The method of claim 1, wherein the generating the message comprises selecting the first entity and the second entity at least as one of the following:
   the first entity is a ground station, and the second entity is one of an aircraft and a group of aircraft;
   the first entity is the aircraft, and the second entity is the ground station;
   the first entity is the aircraft, and the second entity is one of another aircraft and a group of other aircraft;
   the first entity is the another aircraft, and the second entity is one of the aircraft and the group of aircraft;
   the first entity is the ground station, and the second entity is another ground station.

7. The method of claim 1, further comprising:
   modifying the identifier before a flight or take-off, thereby creating a modified identifier; and
   uploading the modified identifier to the second entity and the first entity.

8. The method of claim 1, wherein the generating the identifier further comprises storing the identifier in a database in a memory device, further comprising storing the database in at one of:
- the first entity;
- the second entity;
- a third party server in communication with at least one of the first entity and second entity; and
- another server hosted at the first entity;
- yet another server hosted at the second entity.

9. The method of claim 1, wherein the limiting comprises at least one of the following:
- adjusting a size of the unique set of keys for encryption;
- using another encryption technique;
- encrypting only part of the message;
- compressing the message;
- inserting an index of the message in the payload, instead of inserting the entire message.

10. A system for unicast or multicast transmission via an Automatic Dependent Surveillance-Broadcast (ADS-B) transmission protocol, the system comprising:
- a processor, and a memory device having computer readable instructions stored thereon for execution by the processor, causing the processor to:
  - generate a message to be carried on a ADS-B Universal Access Transceiver (UAT) frame for transmission from a first entity to a second entity;
  - encrypt the message with a unique set of keys associated with the first entity and the second entity to generate an encrypted message;
  - generate a header indicating an ADS-B frame type;
  - generate an identifier for uniquely identifying the second entity, the identifier being known to the first and second entities; and
  - form an ADS-B UAT frame comprising a header portion, and a payload portion comprising a sub-header, comprising:
    - inserting the header into the header portion;
    - inserting the encrypted message and the identifier into the payload portion; and
    - limiting a frame size not to exceed a length of a standard ADS-B UAT frame of 34 bytes as specified in standard specifications;
    - thereby making the ADS-B UAT frame compatible with a standard ADS-B UAT frame; and
  - transmit the ADS-B UAT frame to the second entity, thereby converting the ADS-Broadcast transmission protocol into a unicast or multicast transmission.

11. The system of claim 10, wherein the computer readable instructions causing to insert the encrypted message and the identifier further cause the processor to carry the encrypted message and the identifier on undefined messages of the ADS-B UAT frame having a payload type code between 30 and 31.

12. The system of claim 10, wherein the computer readable instructions causing to insert the encrypted message and the identifier further cause the processor to carry the encrypted message and the identifier on reserved fields of the ADS-B UAT frame having a payload type code between 7 and 10.

13. The system of claim 10, wherein the computer readable instructions causing to insert the encrypted message and the identifier further comprise the processor to carry the encrypted message and the identifier on reserved messages of the ADS-B UAT frame having a payload type code between 11 and 29.

14. The system of claim 10, wherein:
- the identifier is inserted into the sub-header; and
- insert the identifier into the encrypted message.

15. The system of claim 10, wherein the identifier is at least one of:
- the identifier is generated at the first entity;
- the identifier is generated at the second entity; and
- the identifier is retrieved from a third party, in communication with the first and second entity.

16. The system of claim 10, wherein the unique set of keys is encrypted with a private key of the first entity and a public key of the second entity.

17. The system of claim 10, wherein the message is one of the following:
- a command and control message;
- an emergency command;
- an information message;
- a message selected from a menu of predetermined messages.

18. A frame formatter for an ADS-B UAT frame for one of a unicast and multicast transmission from a first entity to a second entity, the ADS-B UAT frame carrying an encrypted message encrypted with a unique set of keys associated with the first entity and the second entity, the frame formatter comprising:
- a memory device having computer readable instructions stored thereon for execution by a processor, causing the processor to:
  - form an ADS-B UAT frame comprising a header portion, and a payload portion comprising a sub-header, comprising:
    - inserting a header indicating an ADS-B UAT frame type into the header portion;
    - inserting the encrypted message and an identifier into the payload portion, the identifier uniquely identifying the second entity, the identifier being known to the first and second entities;
    and
    - limiting a frame size not to exceed a length of a standard ADS-B UAT frame of 34 bytes as specified in standard specifications;
  - thereby making the ADS-B UAT frame compatible with a standard ADS-B UAT frame, and converting the ADS-Broadcast transmission protocol into a unicast or multicast transmission.

19. A frame formatter for an ADS-B UAT frame for one of a unicast and multicast transmission from a first entity to a second entity, the ADS-B UAT frame carrying an encrypted message encrypted with a unique set of keys associated with the first entity and the second entity, the frame formatter comprising:
- a memory device having computer readable instructions stored thereon for execution by a processor, causing the processor to:
  - form an ADS-B UAT frame comprising a header portion, and a payload portion comprising a sub-header, comprising:
    - inserting a header indicating an ADS-B UAT frame type into the header portion;
    - inserting the encrypted message and an identifier into the payload portion, the identifier uniquely identifying the second entity, the identifier being known to the first and second entities;
    and
    - carrying the encrypted message and the identifier on undefined messages of the ADS-B UAT frame, having a payload type code between 30 and 31;

thereby making the ADS-B UAT frame compatible with a standard ADS-B UAT frame, and converting the ADS-Broadcast transmission protocol into a unicast or multicast transmission.

20. A method for unicast or multicast transmission via an Automatic Dependent Surveillance-Broadcast (ADS-B) transmission protocol, the method comprising:
generating a message to be carried on an ADS-B Universal Access Transceiver (UAT) frame for transmission from a first entity to a second entity;
encrypting the message with a unique set of keys associated with the first entity and the second entity to generate an encrypted message;
generating a header indicating an ADS-B frame type;
generating an identifier for uniquely identifying the second entity, the identifier being known to the first and second entities; and
forming an ADS-B UAT frame comprising a header portion, and a payload portion comprising a sub-header, comprising:
inserting the header into the header portion;
inserting the encrypted message and the identifier into the payload portion; and
carrying the encrypted message and the identifier on undefined messages of the ADS-B UAT frame, having a payload type code between 30 and 31;
thereby making the ABS-B UAT frame compatible with a standard ADS-B UAT frame; and
transmitting the ADS-B UAT frame to the second entity, thereby converting the ADS-Broadcast transmission protocol into a unicast or multicast transmission.

21. The method of claim 20, wherein the generating the identifier comprises using one of:
a destination address;
an International Civil Aviation Organization (ICAO) number; and
generating a "code number" for one of:
unicast transmission; and
multicast transmission.

22. The method of claim 20, wherein the generating the message comprises selecting the first entity and the second entity at least as one of the following:
the first entity is a ground station, and the second entity is one of an aircraft and a group of aircraft;
the first entity is the aircraft, and the second entity is the ground station;
the first entity is the aircraft, and the second entity is one of another aircraft and a group of other aircraft;
the first entity is the another aircraft, and the second entity is one of the aircraft and the group of aircraft;
the first entity is the ground station, and the second entity is another ground station.

23. The method of claim 20, further comprising:
modifying the identifier before a flight or take-off, thereby creating a modified identifier; and
uploading the modified identifier to the second entity and the first entity.

24. The method of claim 20, wherein the generating the identifier further comprises storing the identifier in a database in a memory device, further comprising storing the database in at one of:
the first entity;
the second entity;
a third party server in communication with at least one of the first entity and second entity; and
another server hosted at the first entity;
yet another server hosted at the second entity.

25. The method of claim 20, wherein the forming further comprises limiting a frame size not to exceed a length of a standard ADS-B UAT frame as specified in standard specifications.

26. The method of claim 25, wherein the limiting comprises at least one of the following:
adjusting a size of the unique set of keys for encryption;
using another encryption technique;
encrypting only part of the message;
compressing the message;
inserting an index of the message in the payload, instead of inserting the entire message.

27. A system for unicast or multicast transmission via an Automatic Dependent Surveillance-Broadcast (ADS-B) transmission protocol, the system comprising:
a processor, and a memory device having computer readable instructions stored thereon for execution by the processor, causing the processor to:
generate a message to be carried on a ADS-B Universal Access Transceiver (UAT) frame for transmission from a first entity to a second entity;
encrypt the message with a unique set of keys associated with the first entity and the second entity to generate an encrypted message;
generate a header indicating an ADS-B frame type;
generate an identifier for uniquely identifying the second entity, the identifier being known to the first and second entities; and
form an ADS-B UAT frame comprising a header portion, and a payload portion comprising a sub-header, comprising:
inserting the header into the header portion;
inserting the encrypted message and the identifier into the payload portion; and
carrying the encrypted message and the identifier on undefined messages of the ADS-B UAT frame, having a payload type code between 30 and 31;
thereby making the ADS-B UAT frame compatible with a standard ADS-B UAT frame; and
transmit the ADS-B UAT frame to the second entity, thereby converting the ADS-Broadcast transmission protocol into a unicast or multicast transmission.

28. The system of claim 27, wherein:
the identifier is inserted into the sub-header; and
insert the identifier into the encrypted message.

29. The system of claim 27, wherein the identifier is at least one of:
the identifier is generated at the first entity;
the identifier is generated at the second entity; and
the identifier is retrieved from a third party, in communication with the first and second entity.

30. The system of claim 27, wherein a frame size is limited not to exceed a length of a standard ADS-B UAT frame as specified in standard specifications.

31. The system of claim 27, wherein the unique set of keys is encrypted with a private key of the first entity and a public key of the second entity.

32. The system of claim 27, wherein the message is one of the following:
a command and control message;
an emergency command;
an information message;
a message selected from a menu of predetermined messages.

* * * * *